US012481986B2

(12) United States Patent
Bhamidipati et al.

(10) Patent No.: US 12,481,986 B2
(45) Date of Patent: *Nov. 25, 2025

(54) BLOCKCHAIN CONSENSUS PROTOCOL USING PREDICTIVE PROOF OF METRICS

(71) Applicant: eBay Inc., San Jose, CA (US)

(72) Inventors: Venkata Siva Vijayendra Bhamidipati, San Jose, CA (US); Derek Chamorro, San Jose, CA (US); Michael Chan, San Jose, CA (US); Arpit Jain, San Jose, CA (US); Ashok Srinivasa Murthy, San Jose, CA (US); Anirudh Kamalapuram Muralidhar, San Jose, CA (US)

(73) Assignee: eBay Inc., San Jose, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 18/142,185

(22) Filed: May 2, 2023

(65) Prior Publication Data

US 2023/0298011 A1    Sep. 21, 2023

Related U.S. Application Data

(63) Continuation of application No. 16/742,726, filed on Jan. 14, 2020, now Pat. No. 11,676,135.

(Continued)

(51) Int. Cl.
G06Q 20/38 (2012.01)
G06F 9/50 (2006.01)
G06N 5/04 (2023.01)

(52) U.S. Cl.
CPC ......... *G06Q 20/382* (2013.01); *G06F 9/5005* (2013.01); *G06N 5/04* (2013.01)

(58) Field of Classification Search
CPC .... G06Q 20/382; G06Q 20/065; G06Q 20/02; G06F 9/5005; G06N 5/04; G06N 5/046
See application file for complete search history.

(56) References Cited

U.S. PATENT DOCUMENTS 11,676,135 B2   6/2023   Venkata et al.
2019/0124146 A1 4/2019   Austin et al.
(Continued)

OTHER PUBLICATIONS

A thorough introduction to eBPF, Retrieved from Internet URL: https://lwn.net/Articles/740157/, Jan. 27, 2020, 8 pages.
(Continued)

*Primary Examiner* — Asad M Nawaz
*Assistant Examiner* — Najeeb Ansari
(74) *Attorney, Agent, or Firm* — Shook Hardy & Bacon L.L.P.

(57) ABSTRACT

Technologies are shown for selecting a provider to service a client service request using a consensus protocol and creating a block on a blockchain to service the client service request. In accordance with some aspects, a first miner receives parameters of each proposal transaction from a plurality of proposal transactions for servicing a client service request. The parameters of at least one proposal transaction from the plurality of proposal transactions is received from a second miner. The first miner uses a selection algorithm to select a first proposal transaction from the plurality of proposal transactions based on the parameters of each proposal transaction. The first miner appends a block to a blockchain based on the first proposal transaction.

20 Claims, 17 Drawing Sheets

Related U.S. Application Data

(60) Provisional application No. 62/876,314, filed on Jul. 19, 2019.

(56) References Cited

U.S. PATENT DOCUMENTS

| | | | | |
|---|---|---|---|---|
| 2020/0027089 | A1* | 1/2020 | Kuchar | G06F 16/1837 |
| 2020/0241929 | A1 | 7/2020 | Arrasjid et al. | |
| 2020/0409719 | A1* | 12/2020 | Daniel | H04L 9/0643 |
| 2021/0019740 | A1 | 1/2021 | Bhamidipati et al. | |
| 2021/0136068 | A1* | 5/2021 | Smeets | H04L 63/10 |
| 2021/0176058 | A1* | 6/2021 | Cheng | G06F 16/27 |
| 2022/0006860 | A1 | 1/2022 | Lima et al. | |
| 2022/0092593 | A1 | 3/2022 | Wright et al. | |
| 2022/0114193 | A1 | 4/2022 | Oberhauser et al. | |
| 2022/0129889 | A1 | 4/2022 | Sarin | |
| 2022/0156735 | A1* | 5/2022 | Mackay | G06Q 20/065 |
| 2022/0327503 | A1* | 10/2022 | Zhao | G06Q 20/065 |

OTHER PUBLICATIONS

ConsensusPedia: An Encyclopedia of 30+ Consensus Algorithms, Hackernoon, Retrieved from Internet URL: https://hackernoon.com/consensuspedia-an-encyclopedia-of-29-consensus-algorithms-e9c4b4b7d08f, Jun. 26, 2018, 10 pages.

Filecoin: A Decentralized Storage Network, Protocol Labs, Retrieved from Internet URL: https://filecoin.io/filecoin.pdf, Jul. 19, 2017, 36 pages.

Hyperledger Fabric, The Linux Foundation Projects, Retrieved from Internet URL: https://www.hyperledger.org/projects/fabric, Accessed on Jan. 28, 2020, 5 pages.

Proof of Stake Brainstorming, Bitcoin Forum, Retrieved from Internet URL: https://bitcointalk.org/index.php?topic=37194.0, 2011, 7 pages.

Storj: A Decentralized Cloud Storage Network Framework, Storj Labs, Inc., Oct. 30, 2018, 90 pages.

The Golem Project, Crowdfunding Whitepaper, Retrieved from Internet URL: https://golem.network/crowdfunding/Golemwhitepaper.pdf, Nov. 2016, 28 pages.

Bhamidipati et al., "Predictive Proof of Metrics—a New Blockchain Consensus Protocol", Sixth International Conference on Internet of Things: Systems, Management and Security (IOTSMS), Oct. 22-25, 2019, 4 pages.

Dennis et al., "Rep on the Roll: A Peer to Peer Reputation System Based on a Rolling Blockchain", International Journal of Digital Society (IJDS), vol. 7, Issue 1, Mar. 2016, pp. 1123-1134.

Dey,"A Proof of Work: Securing Majority-Attack In Blockchain Using Machine Learning And Algorithmic Game Theory", I.J. Wireless and Microwave Technologies, 2018, pp. 1-9.

Dowling et al., "Emergent Consensus In Decentralised Systems Using Collaborative Reinforcement Learning", Self-star Properties in Complex Information Systems, 2004, pp. 63-80.

Dwork et al., "Pebbling and Proofs of Work", 25th Annual International Cryptology Conference, Aug. 14-18, 2005, pp. 37-54.

Gai et al., "Proof of Reputation: A Reputation-Based Consensus Protocol for Peer-to-Peer Network", International Conference on Database Systems for Advanced Applications, 2018, 666-681 pages.

Georgopoulos et al., "Distributed machine learning in networks by consensus", Neurocomputing @ 2013 Elsevier B.V., 2014, pp. 2-12.

Larimer, "Delegated Proof of Stake (DPOS)", Bitcoin Forum, Retrieve from Internet URL: https://bitcointalk.org/index.php?topic=558316.0, 2014, 10 pages.

Nakamoto, "Bitcoin: A Peer-to-Peer Electronic Cash System", Retrieved from Internet URL: https://bitcoin.org/bitcoin.pdf, 2008, 9 pages.

Outchakoucht et al., "Dynamic Access Control Policy based on Blockchain and Machine Learning for the Internet of Things", (IJACSA) International Journal of Advanced Computer Science and Applications, vol. 8, No. 7, 2017, 8 pages.

Quantummechanic, "Proof of Stake Instead of Proof of Work", Bitcoin Forum, Retreived from Internet URL: https://bitcointalk.org/index.php?topic=27787.0, 2011, 9 pages.

Tsianos et al., "Consensus-Based Distributed Optimization: Practical Issues and Applications in Large-Scale Machine Learning", Oct. 2012, 8 pages.

Vorick et al., "Sia: Simple Decentralized Storage", Retrieved from the Internet URL : <https://sia.tech/sia.pdf>, Nov. 29, 2014, 8 pages.

Weng et al., "DeepChain: Auditable and Privacy-Preserving Deep Learning with Blockchain-based Incentive", Journal Of Latex Class Files, vol. 14, No. 8, Aug. 2015, pp. 1-18.

Wikipedia, "Weaknesses", Retrieved from Internet URL: https://en.bitcoin.it/wiki/Weaknesses#Sybil_attack, Accessed on Jan. 27, 2020, 2020, 7 pages.

* cited by examiner

```
SERVICE TRANSACTION DATA BLOCK                    242

Miner_ID

Trans_ID
Client_ID
Provider_ID
Metrics_data
        service_ID
        req_parameters
        predicted_metrics
Client_payment
Client_completion
Provider_completion

METHODS

Client_pay(Trans_ID, Client_ID, Provider_ID)
{
        Client_payment == TRUE
        status = transfer_payment(Client_ID, Provider_ID);
        Client_payment == TRUE
        if status == SUCCESS
        {
                Client_complete(Trans_ID, Client_ID)
        }
}

Client_complete(Trans_ID, Client_ID)
{
        Client_completion == TRUE
}

Provider_complete(Trans_ID, Provider_ID)
{
        Provider_completion == TRUE
}
```

FIG. 2B

BLOCKCHAIN CONSENSUS PROTOCOL USING PREDICTIVE PROOF OF METRICS

CROSS-REFERENCE TO RELATED APPLICATIONS

This application is a continuation of U.S. patent application Ser. No. 16/742,726, filed Jan. 14, 2020, which claims the benefit of U.S. Provisional Patent Application No. 62/876,314 filed Jul. 19, 2019. Each of the aforementioned applications is herein incorporated by reference in its entirety for all purposes.

BACKGROUND

Blockchains generally provide decentralized distributed ledgers to securely and immutably record transactions and other data. Currently, there are several approaches to maintaining security in blockchains.

One aspect of blockchain security is obtained by Proof of Work, which are typically cryptographic puzzles with dynamic levels of difficulty. Proof of Work generally ensures that it is computationally infeasible for a single party to rewrite the blockchain with its own entries. For public blockchains, this also allows a winning node to be selected that can append a new transaction block to a blockchain.

Another aspect of blockchain security is the use of consensus protocols that act as gatekeepers to authorize a "miner" to write to the blockchain. These protocols are typically of two types: 1) cryptographic computational with very low collision probability to ensure that only one writer wins within a time period; and 2) non-cryptographic protocols, such as Proof of elapsed Time (PoET), Asynchronous Byzantine Fault Tolerance (aBFT), Practical Byzantine Fault Tolerance (pBFT), or Hashgraph augmented parallel consensus protocols.

In digital payment or transaction based blockchains, every transaction itself is an entry in a block. There are many underlying consensus algorithms like Proof of Work (PoW), (See C. Dwork, M. Naor, and H. Wee, "Pebbling and proofs of work," CRYPTO, 2005, and Satoshi Nakamoto, "Bitcoin: A peer-to-peer electronic cash system" Consulted, 1:2012, 2008), Proof of stake (POS) (See User "cunicula", Rosenfeld, M., et al. 2011, Proof of stake brainstorming, Bitcoin forum thread, https://bitcointalk.org/index.php?topic=37194.0 and User "QuantumMechanic" et al. 2011, Proof of stake instead of proof of work, Bitcoin forum thread, https://bitcointalk.org/index.php?topic=27787.0.) and Delegated Proof of Stake (dPoS) (See "Delegated proof-of-stake (dpos)," D Larimer, Bitshare whitepaper, 2014.)

These approaches can choose a "winning block" that is the next set of transactions to write to the blockchain. This is deliberately made atomic to avoid opening windows of time that can lead to out-of-ordering events and double spending.

While this works well for monetary transactions, it doesn't generally lend itself to real world scenarios, which typically involve services that have multiple back and forth negotiation of some sort. In a service economy, customers will want a "best choice" scenario. They may want "best price", "best time", "lowest cost", "lowest cost/latency ratio", geo specificity, and so on-essentially-performance.

Currently, there isn't a single blockchain solution or framework that can cater to these requirements in a way that is completely driven by the blockchain consensus itself, while enabling protection against attacks, such as Sybil attacks (See https://en.bitcoin.it/wiki/Weaknesses#Sybil_attack), and out of order negotiations.

Conventional blockchain solutions primarily store final results/transactions. They typically do not provide any decision making capability based on service requests, offers, final candidates, the winners, and the actual services rendered.

It is with respect to these and other considerations that the disclosure made herein is presented.

SUMMARY

Technologies are disclosed for providing a consensus protocol for providing services to clients, for instance, based on Predictive Proof of Metrics (PPoMs). The disclosed technology can be used in a network architecture to route client requests to providers in a system of providers based on metrics, such as cost, latencies or reputation.

In general terms, technologies are shown for selecting a provider to service a client service request using a predictive metrics based consensus protocol to select a provider and create a service request transaction block to service the client service request. A client service request is received and forwarded to a set of providers. Proposed transactions are received from the providers and scored based on a predictive metric.

A proposal transaction is selected based on the scoring and the selected transaction is written as a block on a service transaction blockchain. The provider for the selected transaction detects the block on the blockchain and performs the requested service. The client detects the block on the blockchain and transfers payment to the provider.

Selection of a proposal transaction can be based on predictive metrics in the providers or macro metrics determined in miner nodes in combination with provider reputation, currency, load sharing, fairness, provisioning, and static and dynamic criteria.

Examples of the disclosed technology concern methods, systems and computer readable media for a predictive metrics based consensus protocol for routing client service transactions to service providers using a service transaction blockchain the method involves receiving a client service request, forwarding the client service request to a set of service providers, and proposed transactions from the set of service providers. These examples also involve scoring the proposal transactions based on at least one predictive metric, selecting a proposal transaction based on the scoring, and writing the selected proposal transaction to a service transaction blockchain.

Some examples also involve creating a candidate block having at least some of the proposed transactions received from the set of service providers, sending the candidate block to other miners in a cluster, and receiving candidate blocks from the miners in the cluster. In these examples, the function of scoring the proposal transactions based on at least one predictive metric involves scoring the proposal transactions in the candidate blocks based on the predictive metric. In some of these examples, the predictive metric involves a macro predictive metric determined in one of the miners.

Certain examples involve determining which one of the miners created the candidate block with the selected proposal transaction and the function of writing the selected proposal transaction to a service transaction blockchain involves the miner determined to have created the candidate block with the selected proposal transactions writing the selected proposal transaction to the service transaction blockchain.

In other examples, the proposal transactions include at least one parameter based on a predictive metric determined in the providers and the function of scoring the proposal transactions based on at least one predictive metric involves scoring the proposal transactions based on the parameter included in the proposal transactions. Some of these examples involve determining the parameter included in the proposal transactions in the providers based on a predictive metric in the providers and as well as a static criterion, a dynamic criterion, and a parameter included in the client service request.

In certain examples, the function of scoring the proposal transactions based on a predictive metric involves scoring the proposal transactions based on a predictive metric along with a provider reputation value, a currency value, a load sharing metric, a fairness metric, or a provisioning metric.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 2B is a data architecture diagram showing an illustrative example of a service transaction data block securing service transaction data that includes methods that are executed by a blockchain platform;

DETAILED DESCRIPTION

Figure 1:
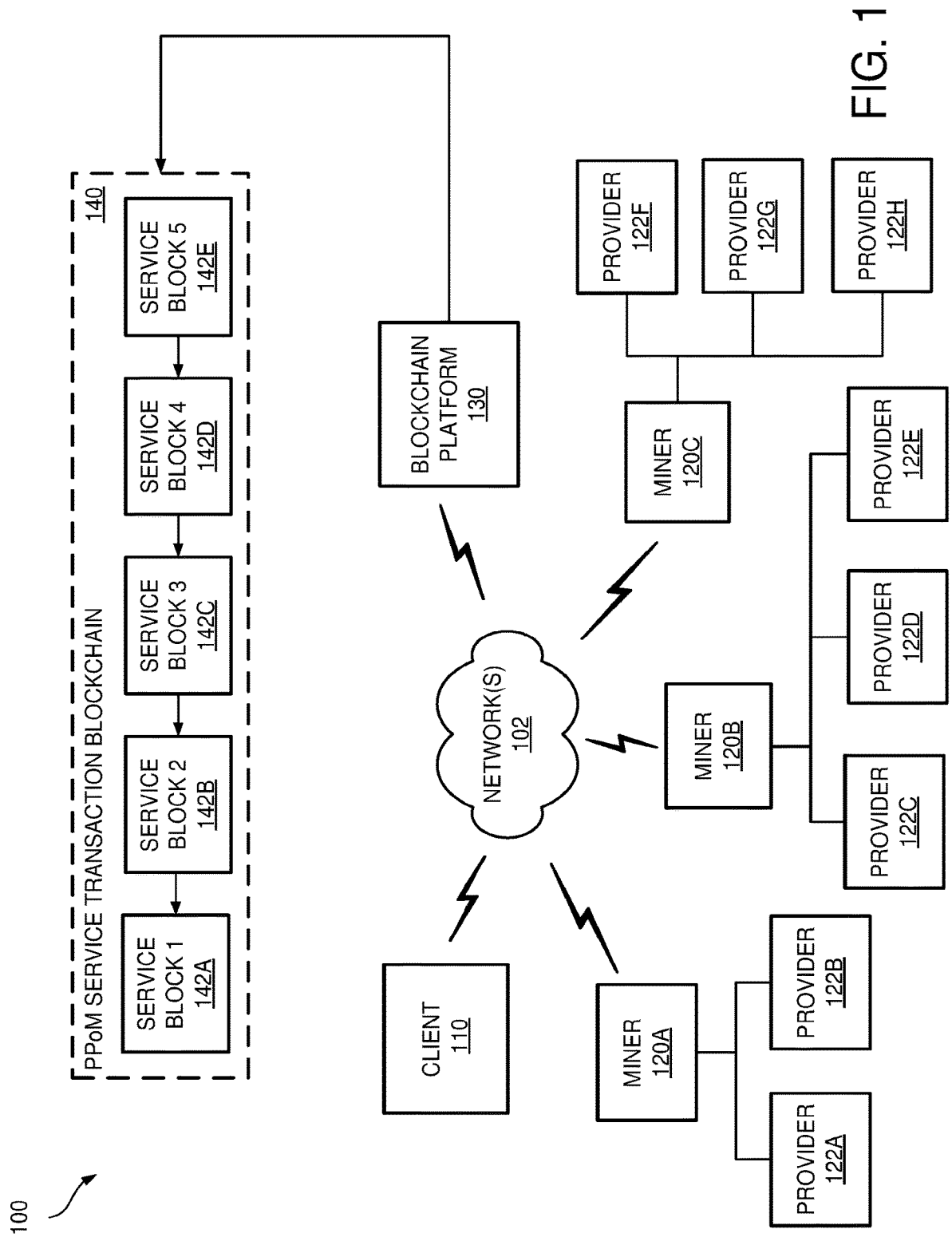
FIG. 1 is an architectural diagram showing an illustrative example of a system for a predictive metrics based consensus protocol for routing client service transactions to service providers using a service transaction blockchain.

Technologies are disclosed for a predictive metrics based consensus protocol for routing client service transactions to service providers using a PPOM service transaction blockchain. The consensus protocol can select a provider to service a client service request based on metrics, such as cost, latencies or reputation, that can incentivize performance, Quality of Service (QOS) or Cost of Service (CoS) using Predictive Proof of Metrics (PPoM). The disclosed technology can be used in a network architecture to route client requests to providers in a system of providers based on metrics such as provider predictive metrics and provider reputation.

In some conventional approaches, there are multiple blockchain frameworks and tokenized schedulers that focus on providing specific computing resources, such as Disk, Memory, and CPU, and track these allocations on a blockchain, such as Golem [https://golem.network/crowdfunding/Golemwhitepaper.pdf], Siacoin [Vorick, D., et al. 2014. "Sia: Simple Decentralized Storage" https://sia.tech/sia.pdf], Storj [Storj Labs Inc., 2018. Storj-https://storj.io/storj.pdf], Filecoin [Protocol Labs., 2017. "Filecoin: A Decentralized Storage Network" https://filecoin.io/filecoin.pdf], etc. However, none of these approaches appear to provide a consensus protocol by themselves (with the exception of Filecoin), nor do they model the real world in a generic enough framework such that they can encompass a wide range of services and not limit themselves merely to a non-adaptive or non-predictive allocation of basic compute resources.

In contrast, a consensus protocol for selecting a provider to service a client service request based on predictive metrics in accordance with the disclosed technology achieves a generalization of real world services, which are driven by concrete metrics that can enable effective allocation of service transactions as well as fairness in a secure manner, while integrating with functional gateways, such as monetary or functional gateways. A predictive metrics based consensus protocol in accordance with certain aspects of the disclosed technology can have a separation of resource based incentives and service charges, while keeping the latter generic enough to be served by cost, currency or payment systems of future systems and architecture.

In general terms, some examples of a predictive metrics based consensus protocol in accordance with the disclosed technology processes a client service request in a cluster of miners. Service providers are registered with the miners in the cluster and each miner forwards the client service request to its registered providers. A provider can analyze one or more predictive metrics to determine whether it can fulfill the request. The provider can, in some examples, also analyze parameters of the client service request to determine whether it can fulfill the request, such as by considering static parameters in the service request or dynamic parameters in the request. The provider creates a proposal transaction based on the service that it can provide responsive to the client request and sends the proposal transaction to the miners with which it is registered.

In particular examples, the miners process the proposal transactions sent by the providers and create candidate blocks with the proposal transactions. Each miner broadcasts its candidate block to the other miners in the cluster so that each miner has a copy of all the candidate blocks. The miners apply the same selection process to the candidate blocks to select a proposal transaction to be the next service transaction data block. The selection process can include evaluating performance or reputations values for the providers of the proposal transactions in addition to predictive metrics. The selection process in the different miners in the cluster will select the same candidate block. In some examples, the miner that originated the candidate block with the selected proposal transaction then writes the proposal transaction as a service transaction data block on a service transaction blockchain.

Clients and providers asynchronously read the service transaction blockchain to determine whether a service transaction data block for the client service request transaction has been added to the blockchain. The client will transfer transaction value to the provider identified in the service transaction data block and set a client completion flag in the block. The provider identified in the service transaction data block will detect when the client completion flag is set and perform the service for the client service request transaction. Once performance is complete, the provider sets a provider completion flag in the block. The miner detects the set provider completion flag in the block and allocates the transaction value to the provider.

One technical advantage of certain aspects of the disclosed technology is that a client service requests can be assigned to a service provider based on predictive metrics relating to performance of the service provider, thereby enhancing overall performance of computers performing the client service requests. Another technical advantage of particular aspects of the disclosed technology is that service transaction data can be securely written, maintained and accessed on a service transaction blockchain. This latter benefit improves computer security.

Another technical advantage of certain aspects of the disclosed technology is that providers can be selected based on macro predictive metrics determined by one or more miners. Yet another technical advantage of some of particular aspects of the disclosed technology is that providers respond to miners with proposal transactions instead of sending the proposal transactions directly to the client, which avoids creating a window of attack, thus further enhancing computer security.

Still another technical advantage of certain examples of the disclosed technology is the use of metrics that are inherently time series based and thus can be easily uniquely identifiable.

Other technical effects other than those mentioned herein can also be realized from implementation of the technologies disclosed herein.

The following Detailed Description describes technologies for a predictive metrics based consensus protocol for routing client service transactions to service providers using a service transaction blockchain in accordance with the disclosed technology.

As will be described in more detail herein, it can be appreciated that implementations of the techniques and technologies described herein may include the use of solid state circuits, digital logic circuits, computer components, and/or software executing on one or more input devices. Signals described herein may include analog and/or digital signals for communicating a changed state of the data file or other information pertaining to the data file.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, mainframe computers, microprocessor-based or programmable consumer electronics, minicomputers, hand-held devices, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for a predictive metrics based consensus protocol for routing client service transactions to service providers using a PPOM service transaction blockchain will be described. As will be described in more detail below with respect to the figures, there are a number of applications and services that may embody the functionality and techniques described herein.

FIG. 1 is an architectural diagram showing an illustrative example of a system architecture 100 wherein a blockchain platform 130 maintains a PPOM service transaction blockchain 140 that can be accessed via a wide area network 102. Client 110, Miners 120, providers 122 and blockchain platform 130 communicate with one another through network 102. Client 110 is representative of many clients that can submit client service requests to miners 120, e.g. a cluster of miners composed of miners 120A, 120B and 120C, in the architecture 100.

Miners 120 register service providers 122 that may be able to service client service requests. Miners 120 also select a provider to service a client service request from client 110 based at least in part on predictive metrics regarding provider performance. Service transaction data blocks 142 that represent client service transactions for client service requests from client(s) 110 are written to the PPOM service transaction blockchain 140 by miners 120. Service transaction data blocks 142 identify a client 110 for a client service transaction along with a provider 122 selected to service the transaction. Service transaction data blocks 142 are accessible by client(s) 110, miners 120, and providers 122 via blockchain platform 130.

In this example, each Miner 120 has a copy of the blockchain. Every Miner 120 is connected to every other Miner 120 through the network 102, such as through long lived gRPC connections, and form a cluster. Miners 120 can generally provide guidance on cost/latencies for client services requested, such as by using a Macro Prediction Engine (MPE) to predict the cost/latencies, route client service requests to suitable Providers 122, and write service transaction blocks 142 to the blockchain 140. Providers 122 generally provide or perform the service requested by a client 110.

Providers 122 can register themselves with one or more Miners 120. Each Provider 122 can belong to a certain Class of Service (CoS). While the CoS of a provider 122 can be initially specified by the provider 122, an MPE can analyze metrics and costs for provider performance and can cluster Providers into Classes of Service by detecting latency/cost clusters. The MPE can dynamically relabel a Provider's CoS. In the certain examples, CoS can be driven by the Class of Metric (COM) and cost, however, the CoS can also be customized in a manner suitable to a particular implementation. As an example, an IoT environment could have very different observed latencies on providers than a ride share environment.

The requesting client can also be assigned a reputation by the PPOM system. The client's public key (e.g. address on the blockchain) can be assigned this reputation score. This can help in detecting misbehaving, compromised, or malfunctioning clients. Equally, a service provider may be assigned a reputation.

Also, in certain examples, there may be multiple types of transactions that can be recorded in service transaction data blocks 142 on blockchain 140, such as: Client requests; Provider proposals; Client payments; Provider completion confirmation; and Client completion confirmation.

In the embodiment of FIG. 1, blockchain 140 can be a publicly available blockchain that supports scripting, such as the ETHEREUM blockchain platform from the ETHEREUM FOUNDATION of Switzerland provides a decentralized, distributed computing platform and operating system that provides scripting functionality for a SOLIDITY scripting language, or BITCOIN, which supports a scripting language called SCRIPT. Blockchain 140 can also be a private blockchain, or a combination of public and private blockchains can be utilized. Note that some examples of the disclosed technology may also work with Directed Acyclic Graph based (DAG) structures instead of a list based blockchain.

Figure 2A:
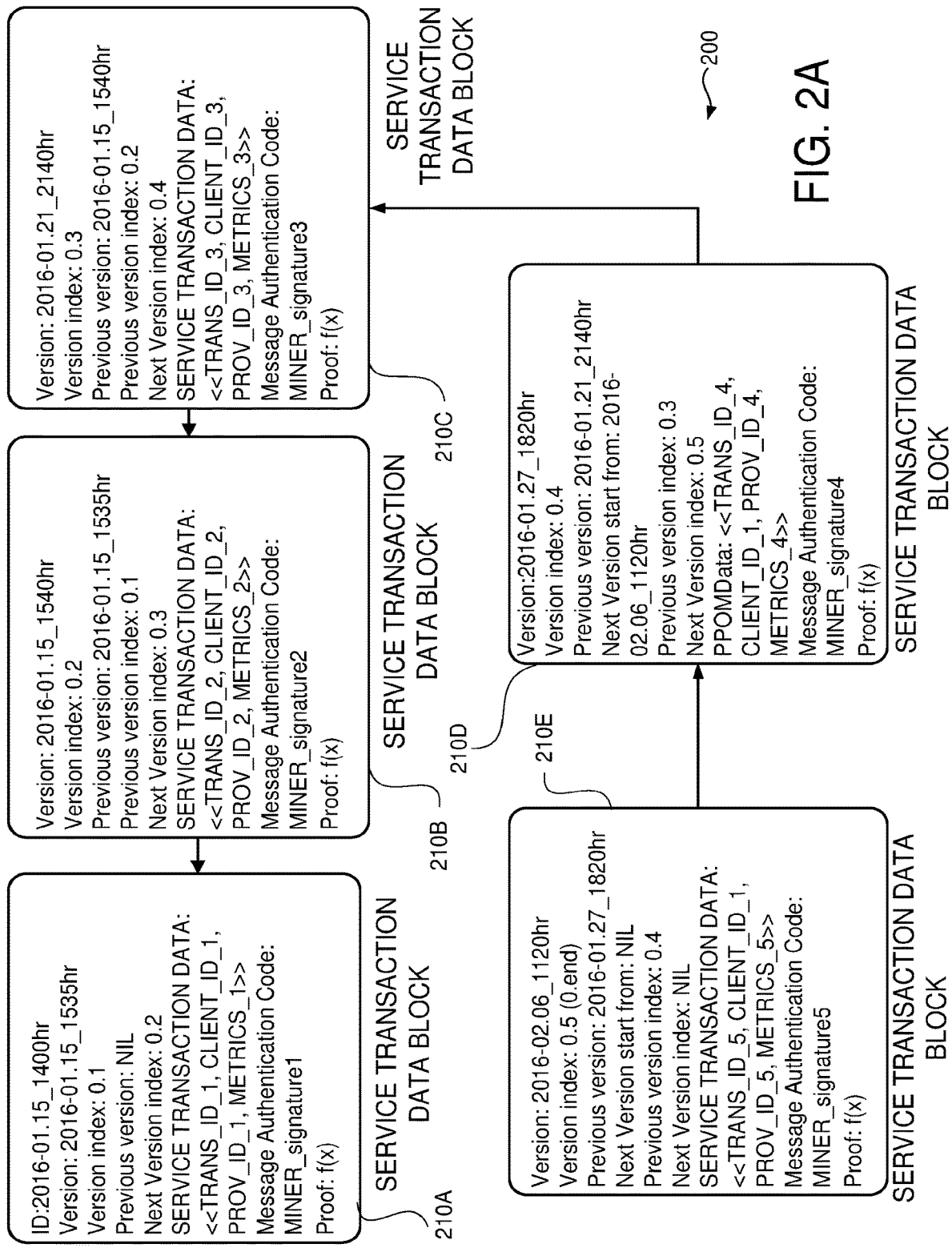
FIG. 2A is a data architecture diagram showing an illustrative example of a PPOM service transaction blockchain securing service transaction data.

FIG. 2A is a data architecture diagram illustrating a simplified example of a PPOM service transaction blockchain ledger 200 based on the blocks 142A-E of the PPOM service transaction blockchain ledger 140 of FIG. 1. The PPOM service transaction blockchain ledger 200 example of FIG. 2A is simplified to show block headers, metadata and signatures of blocks 210A-E in order to demonstrate storage of transaction data using a blockchain. In outline, a blockchain ledger may be a globally shared transactional database. Signatures can, in some examples, involve all or part of the data stored in the data the blocks 142A-E and can also involve public key addresses corresponding to resource origination entities involved in the creation of resources.

The blockchain ledger 200 may be arranged as a Merkle tree data structure, as a linked list, or as any similar data structure that allows for cryptographic integrity. The blockchain ledger 200 allows for verification that the transaction data has not been corrupted or tampered with because any attempt to tamper will change a Message Authentication Code (or has) of a block, and other blocks pointing to that block will be out of correspondence. In one embodiment of FIG. 2A, each block may point to another block. Each block may include a pointer to the other block, and a hash (or Message Authentication Code function) of the other block.

Each block in the blockchain ledger may optionally contain a proof data field. The proof data field may indicate a reward that is due. The proof may be a proof of work, a proof of stake, a proof of research, or any other data field indicating a reward is due. For example, a proof of work may indicate that computational work was performed. As another example, a proof of stake may indicate that an amount of cryptocurrency has been held for a certain amount of time. For example, if 10 units of cryptocurrency have been held for 10 days, a proof of stake may indicate 10*10=100 time units have accrued. A proof of research may indicate that research has been performed. In one example, a proof of research may indicate that a certain amount of computational work has been performed-such as exploring whether molecules interact a certain way during a computational search for an efficacious drug compound.

The blocks 210 of transaction data blockchain 200 in the example of FIG. 2A shows securing service transaction data with a new service transaction data block on the blockchain. In one example, a miner entity, such as one of the miners 120 of FIG. 1, provides a service transaction identifier TRANS_ID_1 and service transaction data for a service transaction when it creates service transaction data block 210A. In this example, the service transaction data includes a client identifier CLIENT_ID_1 for the client requesting the service, a provider identifier PROV_ID_1 for the provider selected to service the client request, and metrics METRICS_1 relating to the service transaction, such as performance parameters included in the client service request or predictive performance metrics provided by the selected provider. The miner entity that creates block 210A authenticates the service transaction data block 210A with its signature MINER_signature1 and the blockchain system within which blockchain 200 is created verifies the service transaction data block based on a proof function.

Note that a variety of approaches may be utilized that remain consistent with the disclosed technology. In some examples, a third party entity, such as a Certificate Authority may be designated as the only entity permitted to verify or validate service transaction data blocks that are selected by miners or routers.

In the example of FIG. 2A, service transaction data blocks 210 of PPOM service transaction data blockchain 200 include transaction identifiers and service transaction data along with a signature of an entity that owns or creates the service transaction data block. To add another service transaction data block for another service transaction, a miner entity creates service transaction data block 210B, which identifies the service transaction TRANS_ID_2 and includes service transaction data with CLIENT_ID_2. PROV_ID_2 and METRICS_2. The miner entity signs transaction data block 210B and commits block 210B to blockchain 200 for verification by the blockchain platform.

To add more service transaction data blocks for an additional service transaction, the same or another miner entity creates service transaction data block 210C to secure service transaction data for transaction TRANS_ID_3 along with service data for the service transaction. Similarly, service transaction data block 242D is created by another miner entity to store the service transaction data for service transaction TRANS_ID_4 and service transaction data block 242E is created to store the service transaction data for TRANS_ID_5.

The service transaction data blocks 142 can be smart contracts that include methods or functions that are executed by the blockchain platform 130. FIG. 2B is a data architecture diagram showing an illustrative example of a service transaction data block 242 with functions that can executed by blockchain platform or framework 130.

In this example, the service transaction data block 242 includes an identifier for a miner entity Miner_ID that created the block along with a transaction identifier Trans_ID for the service transaction, a client identifier Client_ID for the client making the client service request, a provider identifier Provider_ID identifying the provider selected to fulfill the client service request, Metrics_data for the transaction, such as a class of service identifier service_ID, service request parameters req_parameters, and provider predicted metrics predicted_metrics. This example also includes a client payment status flag Client_payment, a client completion status flag Client_completion, and a provider service completion status flag Provider_completion.

The example of FIG. 2B also includes functions Client_pay( ) Client_complete( ) and Provider_complete( ) that can be executed by a VM operating in blockchain platform 130. Client having Client_ID can invoke Client_pay( ) to set Client_payment status flag to TRUE, initiate a transfer of payment transfer_payment to provider having Provider_ID and, if transfer_payment returns SUCCESS, invoke Client_complete( ) to set the Client_completion status flag to TRUE. Provider having Provider_ID can invoke the Provider_complete( ) function to set the Provider_completion status flag to TRUE.

Note that the payment for service performed by a provider to a client can be paid for with fiat or crypto currency or equivalent or in PPoM currency that can entitle a provider to obtain resources, such as compute resources, in a network. For examples that utilize real world currency, the PPOM service transaction blockchain can be tied to a sidechain that acts as a payment gateway for this purpose. Such services can be provided by standard payment gateway clients that run in the form of Smart Contracts on the PPOM service transaction blockchain. Direct incorporation of payment into the PPOM service transaction blockchain, such as requiring a provider put currency in escrow in order to submit a proposal transaction, can generally mitigate Denial of Service (DOS) attacks.

Figure 3A:
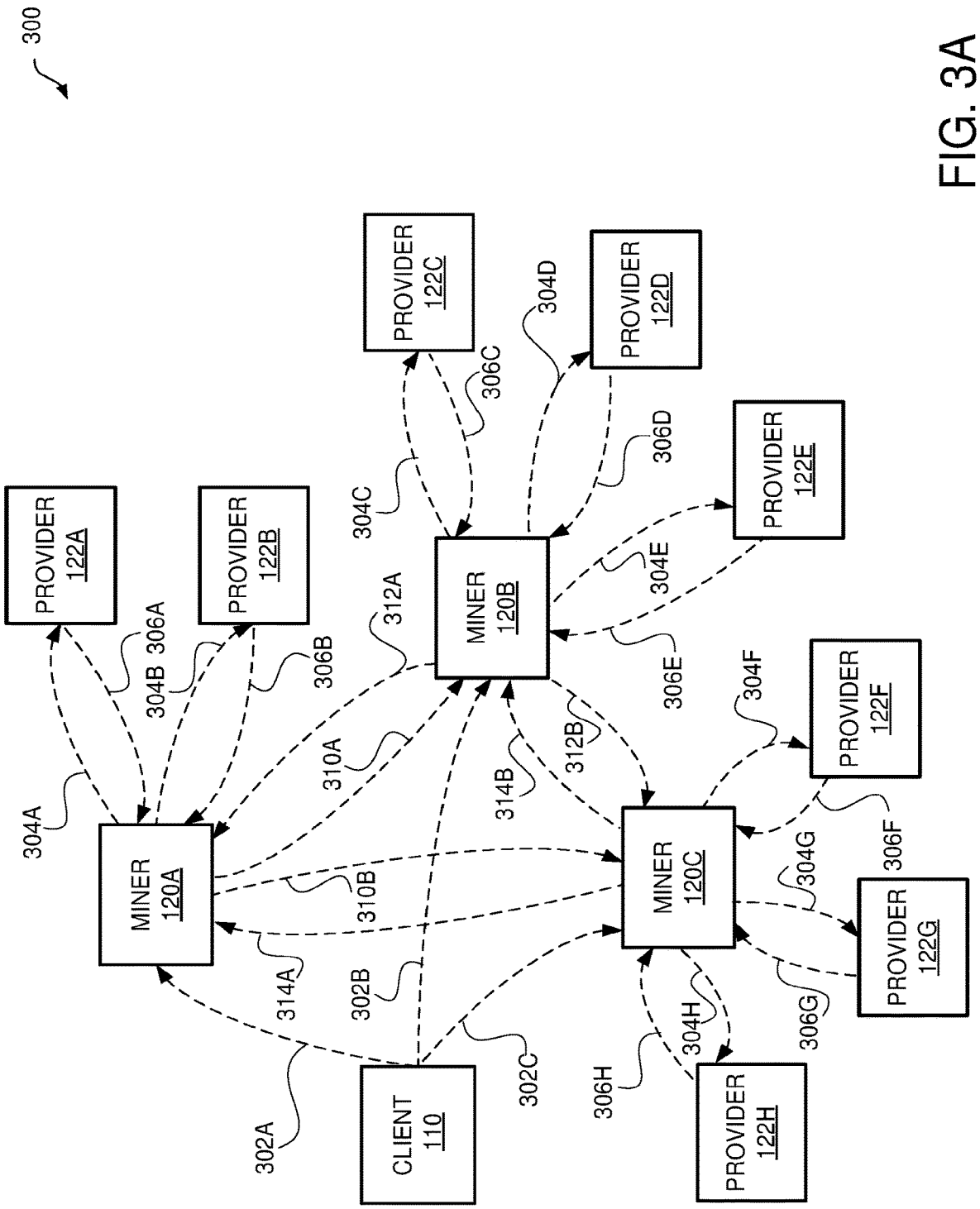
FIG. 3A is a schematic diagram showing an illustrative example of message traffic in a predictive metrics based consensus protocol for routing client service transactions to service providers using a service transaction blockchain in accordance with the disclosed technology.

FIG. 3A is a schematic diagram showing an illustrative example of message traffic in an architecture 300 for a predictive metrics based consensus protocol for routing client service transactions to service providers using a PPOM service transaction blockchain in accordance with the disclosed technology. In this example, client 110 sends a client service request message 302A-C to one or more miners 120A-C of a miner cluster that perform the predictive metrics based consensus protocol for routing client service transactions to service providers using a PPOM service transaction blockchain.

Miners 120 forward the client service request message in messages 304 to providers 122 that are registered to each miner. Providers 122 can apply metrics, including predictive metrics and static metrics, to the client service request, such as applying metrics to parameters, e.g. class of service, type of service, performance or cost requirements, included in the client service request message. For example, a client may want such a QoS that assures accurate timing because it may need such accurate timing to chain it with requesting a subsequent set of services. A QoS of this nature may be provided to clients at a price level determined accordingly.

Based on the application of metrics to the client service request message, each of the providers 122 can provide a proposal transaction 306 to one or more of the miners 120 to which the provider is registered, where the proposed transaction can include offers with parameters defined for cost, performance criteria, e.g. function or service latency, whether the performance is guaranteed, currency, etc. depending on the service requested in the client service request.

Note that providers 122 send proposal transactions 306 to miners 120 with which they are affiliated, e.g. registered. Having providers 122 respond to miners 120 rather than responding directly to the client 110 generally avoids opening a window of attack to hackers or other malevolent entities. Also note that the proposal transactions can be in the form of a potential service transaction data block, such as service transaction data block 242 in FIG. 2B, such that the proposal transaction can be readily added to the PPOM service transaction blockchain.

Miners 120 collect the proposal transactions received from the providers in messages 306 and create candidate blocks based on the received proposal transactions. Each miner 120 in a cluster broadcasts its candidate block to the other miners in the cluster. In the example shown, miner 120A transmits its candidate block to miner 120B in message 310A and to miner 120C in message 310B. Miner 120B transmits its candidate block to miner 120A in message 312A and to miner 120C in message 312B. Miner 120C transmits its candidate block to miner 120A in message 314A and to miner 120B in message 314B.

A miner can broadcast the candidate block it prepares as a candidate block to other miners in a consensus cycle period, such as every three seconds. A period size of three seconds can be utilized as an upper bound representation for intercontinental traffic latencies. However, the consensus cycle period can be a configurable parameter when building/bootstrapping the PPOM service transaction blockchain.

Figure 3B:
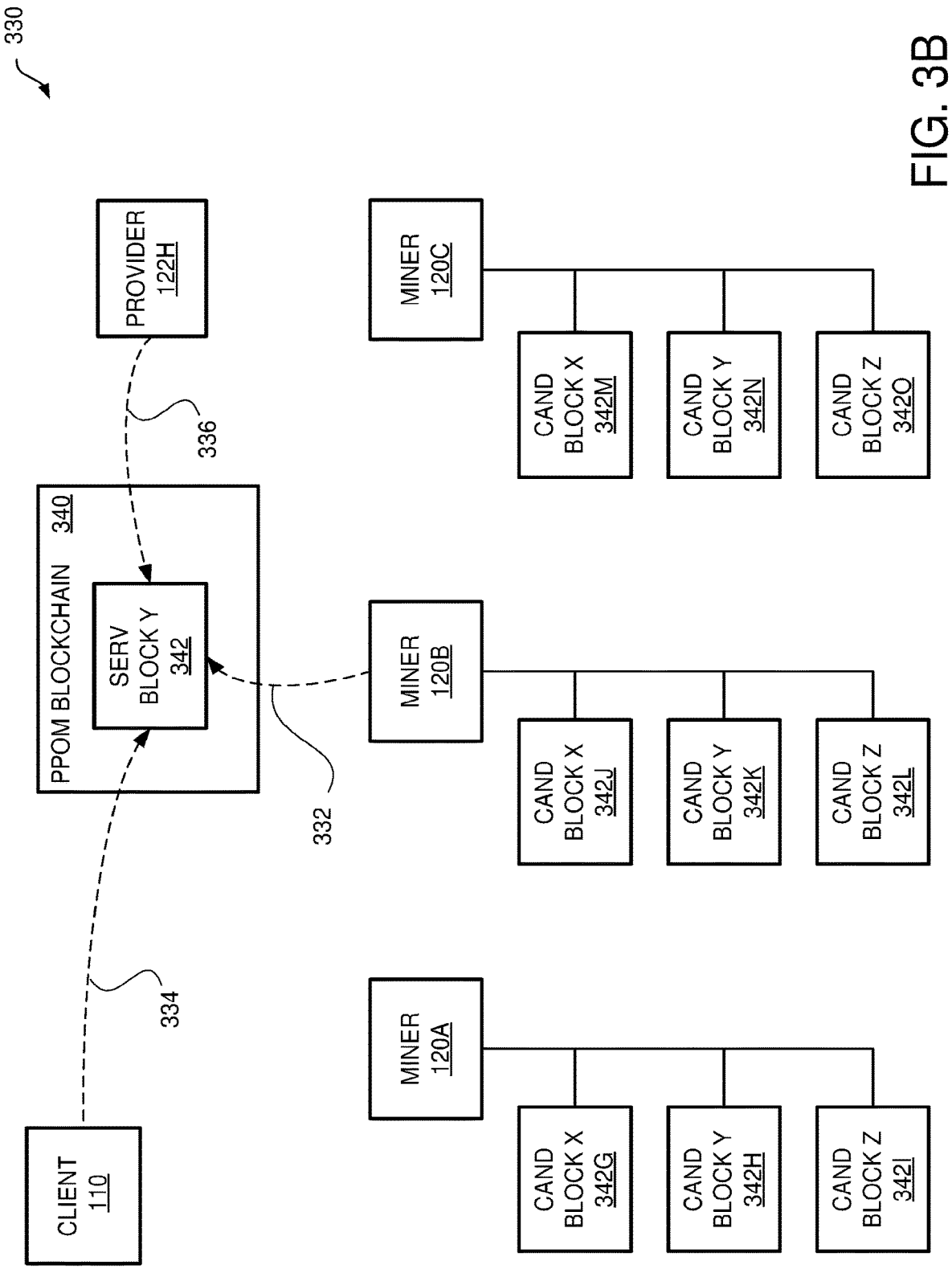
FIG. 3B is a functional block architecture diagram showing an illustrative example for miners selecting a provider using predictive metrics to service the client service request of FIG. 3A using a service transaction data block in a service transaction blockchain in accordance with the disclosed technology.

FIG. 3B is a functional block architecture diagram showing an illustrative example for miners 120A-C selecting a provider 122 to service the client service request of FIG. 3A using a service transaction data block 342 in a PPOM service transaction blockchain 340 in accordance with the disclosed technology.

Once the miners 120 have exchanged candidate blocks, each miner 120 has its own copy of each of the candidate blocks from all miners in the cluster. In this example, miner 120A includes a copy 342G of candidate block X that it created along with a copy 342H of candidate block Y created by miner 120B and copy 342I of candidate block Z created by miner 120C. Miner 120B includes a copy 342J of candidate block X created by miner 120A, a copy 342K of candidate block Y that it created and copy 342L of candidate block Z created by miner 120C. Miner 120C includes a copy 342M of candidate block X created by miner 120A along with a copy 342N of candidate block Y created by miner 120B and copy 342O of candidate block Z that it created.

Once the miners 120 have the candidate blocks X, Y and Z for the miner cluster, each miner 120 applies a selection algorithm to the candidate blocks to identify a provider 122 to service the client service request. Because each of the miners 120 applies the same selection algorithm, each miner 120 will identify the same provider 122 in its copy of the candidate blocks X, Y and Z.

In one example, each miner 120 checks the candidate block that includes the selected provider to determine whether it created the candidate block. If a miner 120 determines that it created the winning candidate block, then it writes a service transaction data block 342 for the service transaction to PPOM service transaction blockchain 340.

Client 110 and the provider 122 asynchronously read PPOM service transaction blockchain 340 to determine whether a service transaction data block 342 exists that identifies them. In one example, client 110 invokes Client_pay( ) to transfer payment to the provider identified in the service transaction data block 342 and set the Client_completion flag to TRUE in the block 342.

When the provider selected to service the client service request, e.g. Provider 122H, finds itself identified in Provider_ID for service transaction data block 342, the provider checks whether the Client_completion flag is set to TRUE, and, if the flag is set, performs the service requested in the client service request and calls the Provider_complete( ) function to set the Provider_completion flag to TRUE.

In one example, the miner 120 that created the service transaction data block 342, e.g. the miner identified in Miner_ID in the block, checks whether the Provider_completion flag is set to TRUE and, if so, allocates or releases payment for the service to the service provider identified in Provider_ID. In other examples, the client identified in Client_ID can check for the Provider_completion flag set to TRUE and complete transfer of payment to the provider in Provider_ID. It will be readily appreciated that the disclosed technology has sufficient flexibility that a variety of approaches that can be utilized within the scope of the disclosed technology. As just one example, the transfer of payment may be partial as work is undertaken, or arranged in any other way.

In some particular examples, the miners in a consensus protocol network according to the disclosed technology can be divided into partitions with equal numbers of miners, such as equal halves, each having one half of the miners, or into multiple partitions, with each partition having the same number of miners. A client can generally broadcast its request to all the miners that it can reach.

If there are N partitions at this point, and the client can reach M partitions, then M requests can reach the miners in each of the M partitions. Service availability may not be significantly adversely impacted if there is at least one provider in any one of the partitions that can serve the client.

In one illustrative example, there are K>M providers within those M partitions that pick up the request and determine whether they can serve the request. Out of these partitions, a max of M providers can have transactions that make their way into blocks. Thus, in this example, a maximum of M blocks can be written, one to each partition's copy of the blockchain. As operations proceed in this manner, M different forks of the blockchain can arise.

However, in this example, each of these blocks are only proposal blocks. The actual service has yet to be rendered. When a provider detects that it has been chosen, it can attempt to carry out the service, but this will generally occur after the requesting client updates the provider transaction with an addendum that adds the ID of the actual payment transaction. Thus, in this example, only one partition's provider will ever be chosen by the client to carry out the service. In enterprise deployments, such payments may not be necessary. In such a case, a zero payment transaction ID can still be recorded by the client.

When the partitions are resolved and the miners form bigger groups and can thus gain a quorum, transactions can be merged and final blocks requested to be rebuilt by specific miners for those transactions that were actually paid for and rendered by the providers.

Figure 3C:
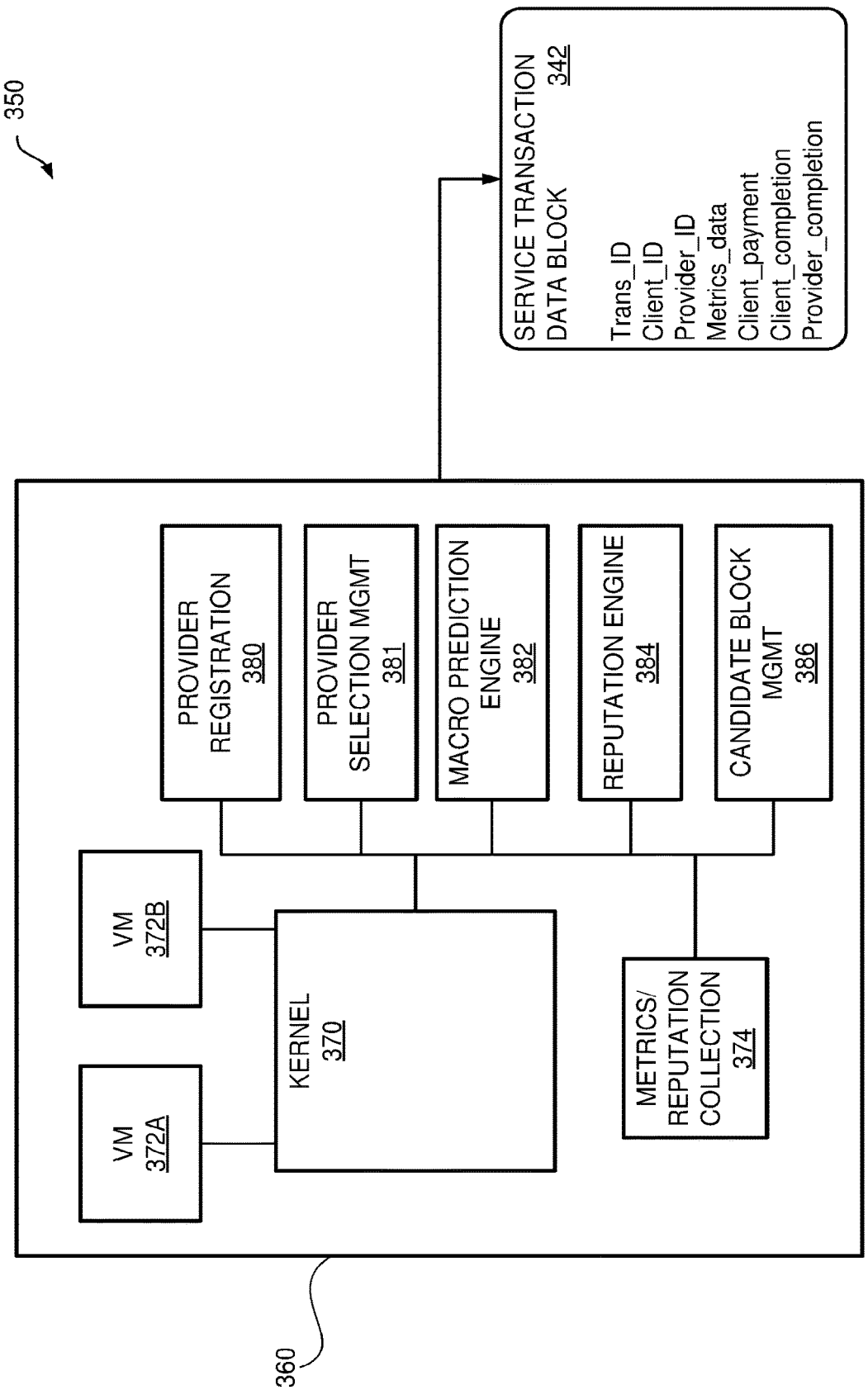
FIG. 3C is a software architecture diagram showing an illustrative example of a miner in the architecture of FIGS. 3A and 3B in accordance with the disclosed technology.

FIG. 3C is a software architecture diagram showing an illustrative example of a miner in the architecture of FIGS. 3A and 3B in accordance with the disclosed technology. A miner 360 can be a miner node in a blockchain platform, such as blockchain platform 130 in FIG. 1, or can be an entity separate from a blockchain platform.

In this example, miner 360 includes a kernel 370 that supports virtual machines 372A and 372B, which can execute the processes described herein that provide service provider registration 380, provider selection management 381, a macro prediction engine 382 that, in some examples, can provide predicted metrics for service providers 122 to provider selection management module 381. Reputation engine module 384 can provide reputation data for scoring service providers and candidate blocks to provider selection management module 381.

Note that provider registration 380 module can, in some examples, assign an initial CoS to a provider, which can be revised based on performance data collected from on-going transactions on the blockchain.

Also note that, in certain examples, provider registration module 380 can utilize a multi ring or cluster architecture where role-based virtual network(s) of miners can be created, and where each ring or cluster addresses requests for a specific CoS or QoS alone. The miners themselves can act as CoS/QoS routers. This may increase throughput in a heterogeneous service environment, while increasing availability and resilience to failure.

Metrics/Reputation collection module 374 can collect and store data for performance metrics for use in macro prediction engine module 382 or reputation data for use in reputation engine 384. Metrics collection module 374 can utilize system level support to run, such as executing in a privileged VM that runs the metrics collection. In some examples, function boundary detection instrumentation in the kernel 370 of the underlying operating system may be used for metrics collection.

Provider selection management module 381 can utilize macro prediction metric data from macro prediction engine (MPE) 382 and reputation data from reputation engine 384 to select a provider in a predictive metrics based consensus protocol for routing client service transactions to service providers in accordance with the disclosed technology.

In some examples, MPE 382 can analyze metrics and costs and can cluster providers into Classes of Service (CoS) by detecting latency/cost clusters. Each provider 122 can belong to a certain CoS. While the CoS of a provider 122 can be initially specified by the provider 122 itself, MPE 382 can revise the provider's CoS based on further metrics data is collected from service transactions data on a PPOM services transaction blockchain.

One of the goals of the MPE 382 can be to recognize different Classes of Service by analyzing historical metric data that has been recorded into the PPOM service transaction blockchain 140, and based on that, activate as required, a meta layer to determine which model to use for which CoS to create guidance periodically to clients that request services. The same or different MPE 382 can be distributed among different clusters of miners serving different CoSs. The models that each miner runs as part of the MPE 382 can be better served per CoS. Having different types of MPEs may be useful for different real world applications, such as scientific research, e-commerce, finance, transportation, and shipping, among others.

For example, as final transactions are written out to the PPOM service transaction blockchain, MPE 382 can run in the background as a separate service (e.g. in its own set of data centers or equivalent). In certain examples, the MPE can perform the following: (a) Analyze transactions being recorded on the blockchain and attempt to cluster them into different Classes of Service; (b) Based on its analysis of cost to latency ratios across different CoSs, it can issue guidance numbers to miners that clients and providers can request from a miner.

In certain examples, MPE 382 can also collect, track and analyze latency data for providers servicing client requests in service transactions. The latency data can be plotted and analyzed using one or more models to obtain latency predictions. Examples of models that can be used include Tree Regression, Random Forest (RF), or Support Vector Machine learning (SVM). In some examples, one or more models can be applied to latency data for clusters of providers to determine a Quality of Service (QOS) that can be incorporated into a provider selection algorithm in provider selection management module 381.

In other examples, the one or more models can be applied to latency data for a provider to determine the QoS that the provider can promise in a proposal transaction. In some examples, MPE 382 can collect and analyze this data and provide it to the providers 122. In other examples, a provider predictive engine residing in each provider 122 can collect and analyze the data to obtain the QoS that the provider can promise. The QoS is utilized in determining the proposal transaction 306, e.g. at step 426 of FIG. 4B, that each provider 122 sends to its affiliated miner 120.

Candidate block management module 386 can create and exchange candidate blocks in a cluster of miners and apply a selection algorithm to the candidate blocks to select a service provider 122 to service the client service request. Candidate block management module 386 can also write service transaction data block 342 to a PPOM service transaction blockchain, such as blockchain 340.

It will be readily appreciated that the disclosed technology enables a complex and sophisticated predictive metrics based consensus protocol for routing client service transactions to service providers using a PPOM service transaction blockchain.

Many variations can be implemented that differ in certain respects from the examples illustrated or go beyond the examples illustrated yet remain within the scope of the disclosed technology.

Figure 4A:
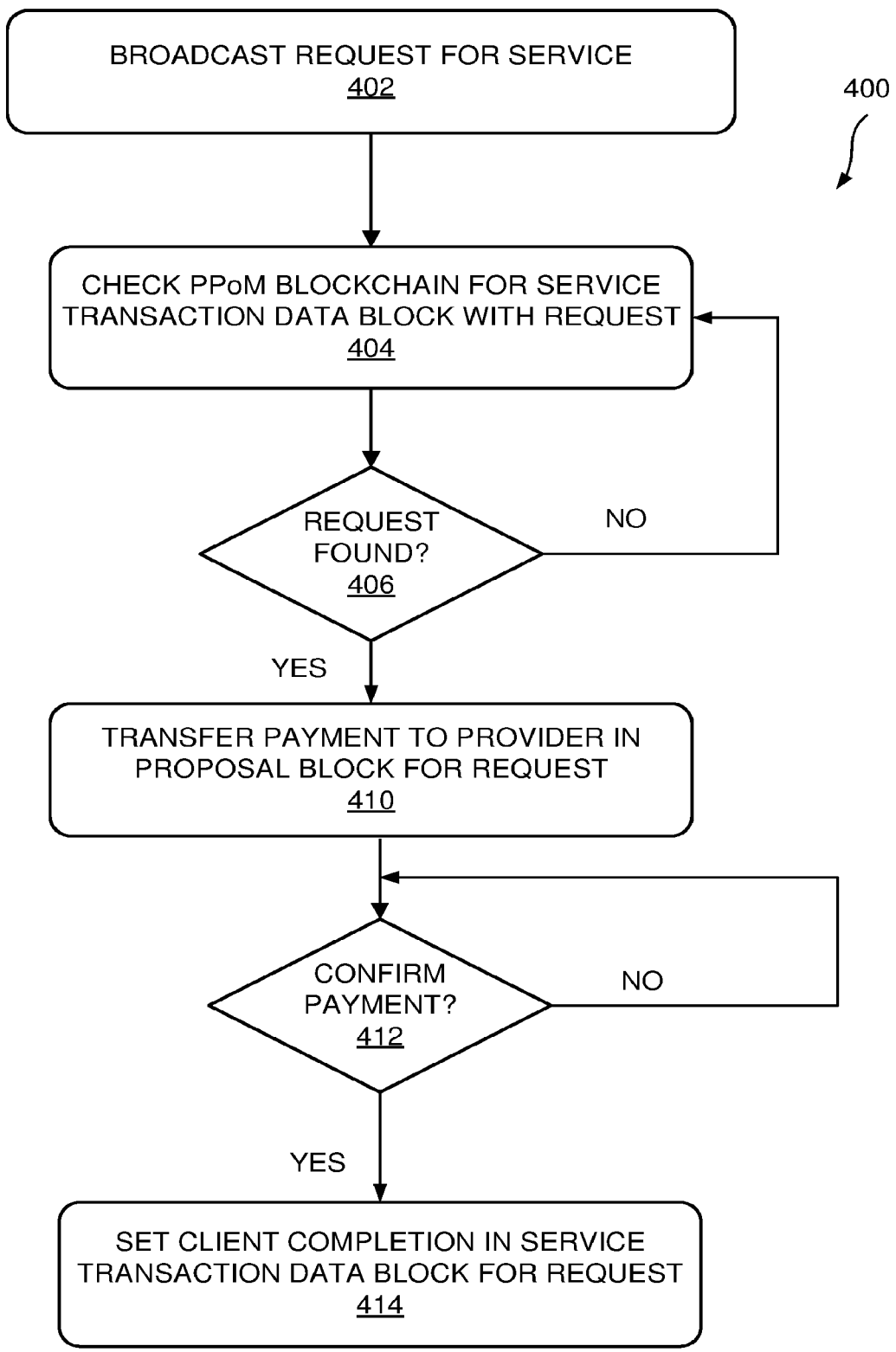
FIG. 4A is a control flow diagram showing an illustrative example of a process in a client node for requesting a service from a predictive metrics based consensus protocol for selecting a provider to service a client service request in accordance with the disclosed technology.

FIG. 4A is a control flow diagram showing an illustrative example of a process 400 in a client node, such as client 110 in FIGS. 1, 3A and 3B, for requesting a service from a consensus protocol for selecting a provider to service a client service request in accordance with the disclosed technology. At 402, a client service request is broadcast to a cluster of one or more miners 120. The client service request can take the form of a request for a particular class or type of service and can include service parameters.

In some examples, the service requested can involve a computational or storage service for the client. The parameters can also include performance requirements, such as latency or computational cost. The client service request can take other forms, such as a request to perform a real-world task, such as "I need a ride from place A to place B at time t1."

In some examples, when the client broadcasts a service request, it also deposits a set amount of value, which can be computational or PPOM "currency" or other value, in an escrow. The purpose of depositing currency in an escrow is to disincentivize Denial of Service attacks.

In other examples, system entities (clients, miners, providers) can have reputation values, which may be stored in the PPOM service transaction blockchain, in the miners, or in another entity accessible to the system entities. In some examples, a client may not broadcast a request to a miner with a low reputation. Similarly, a miner may ignore or throttle requests from a client with a low reputation.

After the client has broadcast the service request, at 404, it will read the PPOM service transaction blockchain to determine if a service transaction data block on the PPOM service transaction blockchain includes the client service request, e.g. includes a service transaction with the Tran_ID of the client service request. If the client service request is found, then control branches at 406 to 410. If it is not found, then control flow branches at 406 to 404 to continue asynchronously reaching the blockchain.

In this example, at 410, the client transfers payment to a provider identified in the service transaction data block as selected to fulfill the service request, e.g. Provider_ID. At 412, if the client confirms completion of the payment, then control branches to 414 to set the Client_completion status flag in the service transaction data block for the service transaction.

Note that other examples can involve payment to the provider after the provider has completed the service. A variety of approaches can be taken in a variety of different designs that are in accordance with the disclosed technology.

In some examples, a client's eligibility to request a service can be tied to its ability to pay and smart contracts that can verify the ability to pay with the sidechain by, for example, deducting the payment for the service from the client's funds to put into escrow for the service. When the service is completed, the provider can be automatically paid from the escrow. In some examples, miners may not be paid for by this mechanism.

When a service fails to be delivered, the assigned smart contract can retry the broadcast on behalf of the client. In some examples, after a configurable number of retries, the request can be marked cancelled and the funds in escrow returned to the client. In some examples, to cover the losses incurred by the requesting client, its reputation can be increased. If a client requests a service that no provider can provide in the first place, it may generally not be granted more reputation, and its funds in escrow can be returned. If a client has very poor reputation, a miner can choose to not consider its requests anymore or, alternatively, prioritize a client's requests if the client has a high reputation level.

Note that if a misbehaving client plants its own provider, to try and spoof availability of services, and then issues requests to the network and gets higher reputation, it can show up in the provider's reputation. In this example, an attacker can win as a client, but will lose as a provider. Also, this pattern of communication can show up in the blockchain itself due to failed transactions, and that can show up as anomalous behavior and the client and provider can be blacklisted or deactivated.

Note that addendum transactions can be written as separate blocks so that they are not affected by dropping of blocks.

Figure 4B:
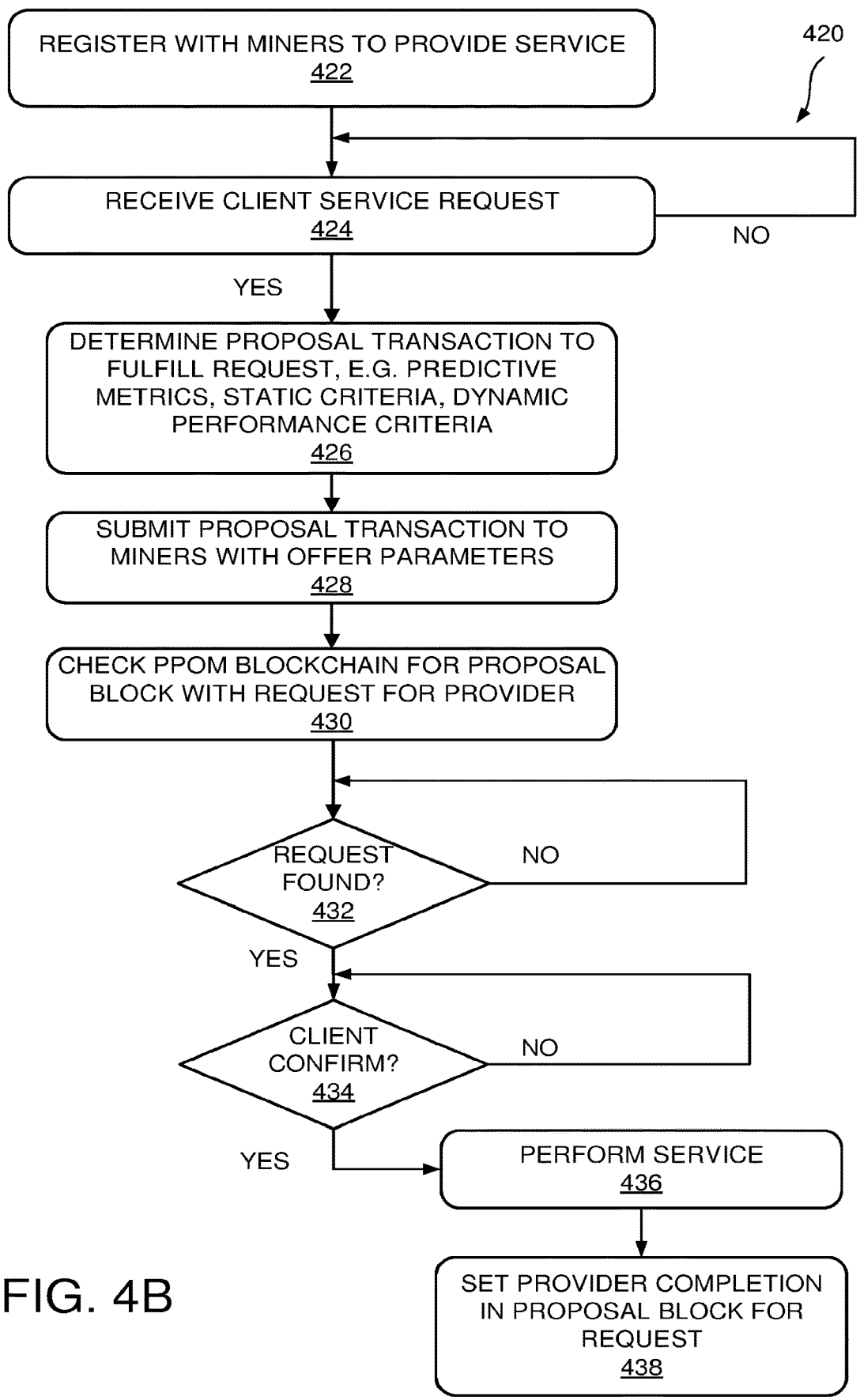
FIG. 4B is a control flow diagram showing an illustrative example of a process in a provider node for servicing a client service request in a predictive metrics based consensus protocol for selecting a provider to service a client service request in accordance with the disclosed technology.

FIG. 4B is a control flow diagram showing an illustrative example of a process 420 in a provider node, such as providers 122 in FIGS. 1, 3A and 3B, for servicing a client service request in a predictive metrics based consensus protocol for selecting a provider to service a client service request in accordance with the disclosed technology.

At 422, the provider node registers with one or more miners to service client service requests. In some examples, providers can register themselves with one or more miners. In certain examples, each provider can belong to a certain Class of Service (CoS). While the CoS of a provider can be initially specified by the provider, a Macro Prediction Engine (MPE), such as MPE 382, can be utilized to analyze metrics and costs and can cluster providers into Classes of Service by detecting latency/cost clusters and dynamically determine a provider's CoS.

In the PPOM environment of the disclosed technology, a CoS may be driven by a Class of Metric (COM) and cost or other customized criteria relevant to a particular application environment. For example, an Internet of Things (IoT) environment will likely have very different observed latencies on providers than a ride share environment.

At 424, the provider receives a client service request. At 426, the provider determines a proposal to fulfill the client service request using one or more criteria. For example, a provider can determine whether it can fulfil a request for a service in at least two ways: Static and Predictive.

A static method can be used when the request made is satisfiable with guarantees. For example, if a client wants to utilize a VM or cloud storage in a given time interval for an amount X, a provider that can fulfil the request during the time interval at a price<=x can fulfil the request. In another context, a client that requests to buy a toy for amount X, a provider that can fulfil the request at a price<=X (which may be inclusive of other parameters like shipping, taxes, etc.) can fulfil the request.

In situations where a guaranteed proposal offer cannot be made, a predictive method can be used to determine whether a provider can fulfil a request. For example, if a client wants to invoke a certain computational service, like preparing a report, within a functional/service latency of x milliseconds or y seconds.

In accordance with the disclosed technology, the provider can also offer a proposal based on its ability to determine a predictive metric, e.g. future QoS, that indicates the performance that the provider can promise. In some examples, the provider 122 may obtain the predictive metric from a miner 120, e.g. a QoS from MPE module 382 in FIG. 3C.

In other examples, the predictive metric can be determined in the provider itself based on a set of historical records or data on how the provider has fared when servicing the same or a similar client service request. As noted above, a PPE residing in provider 122 can collect and analyze performance data using one or more models to obtain a predictive metric for performance that the provider can promise, e.g. future QoS. For example, a provider may utilize the PPE to predict a latency for a requested service for inclusion in a proposal transaction. It will be appreciated that a wide array of predictive metrics, static criteria or dynamic performance criteria can be utilized to develop a proposal transaction for a provider in accordance with the disclosed technology.

Generally, prediction engines in providers will attempt to strike a balance between cost, reputation and service latency using various models, such as an RF or Tree model combined with spike analysis, to predict QoS. A predictive engine in a provider may be customized using models that work best for the services provided by that specific provider and independently deployed in different providers.

Note that a machine learning based predictive model can fail over time because they are based on data observed between certain time intervals and the pattern of the data itself may change significantly (for better or worse) as time progresses, which can render the current models unable to effectively predict QoS. For this reason, in certain examples, provider predictive engines can attempt to make predictions based on more recent data.

Once a provider determines that it can fulfill the service request at 426, it submits the proposal transaction to fulfill the service request to the one or more miners with which it is registered. For example, the proposal transaction can identify the provider's predicted latency, cost, or other performance criteria depending on the service and broadcasts the proposal transaction to the miners with which it is affiliated.

Note that the proposal transactions can be in the form of a potential service transaction data block 242 in FIG. 2B, such that the proposal transaction can be readily added to the PPOM service transaction blockchain 140 or 240.

Also note that multiple providers will typically determine proposal transactions for the service request and the proposal transactions are sent to the one or more miners. As a result, each miner 120 will typically have a batch of proposal transactions from multiple providers 122.

At 430, the provider asynchronously reads the PPOM service transaction blockchain to determine whether a service transaction data block for the client service request transaction has been added to the blockchain. If a service transaction data block is found, at 432, then the provider will check, at 434, whether the client completion flag is set and, at 436, perform the service for the client service request transaction. Once performance of the service is complete, then, at 438, the provider sets a provider completion flag in the service transaction data block.

In certain examples, once a provider carries out the requested service, it can create an addendum transaction that a miner will write out eventually to the blockchain. Once written to the blockchain, the result can be verified by the client, which creates yet another addendum transaction on the blockchain and will can be written by one of the miners. In many examples, these transactions will not have incentives associated with them.

As noted above, in other examples, the process in the provider can be modified to perform the service for the client service request before the client transfers payment to the provider. In such a case, control could flow from 432 to 436 to perform the service.

Figure 4C:
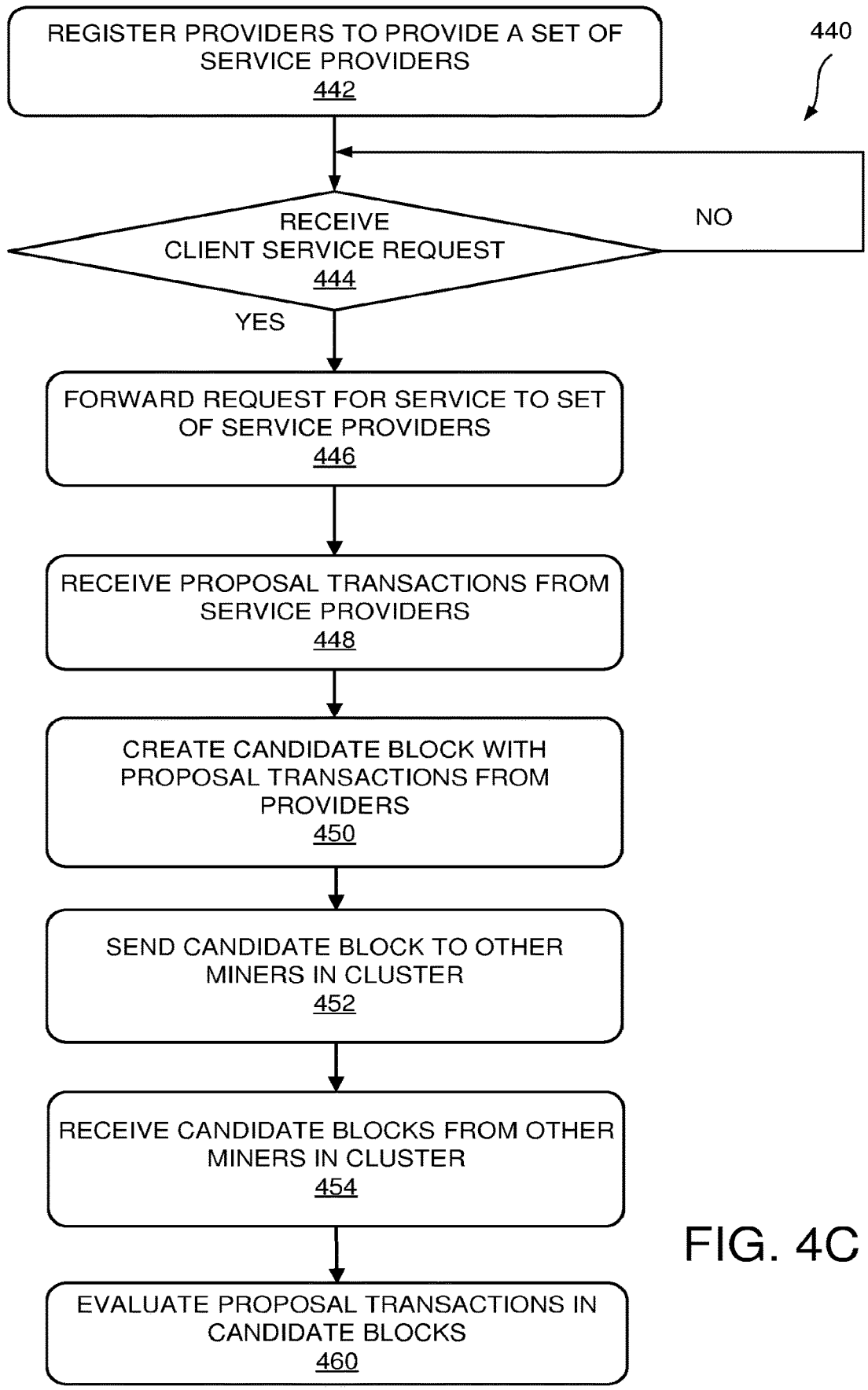
FIG. 4C is a control flow diagram showing an illustrative example of a process in a miner node for selecting a provider to fulfill a client service request in a predictive metrics based consensus protocol in accordance with the disclosed technology.

FIG. 4C is a control flow diagram showing an illustrative example of a process 440 in a miner node, such as miner 120 in FIGS. 1 and 3A-B or miner 360 in FIG. 3C, for selecting a provider to fulfill a client service request in a predictive metrics based consensus protocol in accordance with the disclosed technology.

As noted above, at 442, a miner can register one or more providers, such as providers 122 in FIGS. 1, 3A and 3B, to provide a set of service providers to service client service requests, such as registration of providers by the provider registration module 380 of FIG. 3C.

At 444, the miner receives a client service request and, at 446, forwards the client service request to the set of service providers. Note that a miner can, at this step, select providers to exclude from the set of service providers, such as exclusions based on reputation or CoS of the provider.

At 448, the miner receives one or more proposal transactions from providers. As noted above, each miner will typically receive multiple proposal transactions from multiple providers. At 450, the miner creates a candidate block with the proposal transactions it has received from the providers. Note that, in some examples, the miner can exclude certain proposal transactions from the candidate block, at this step, based on various criteria, such as provider reputation, provider usage history, or candidate block size.

At 452, the miner sends its candidate block to other miners in its cluster. At 454, the miner receives the candidate blocks from the other miners in its cluster. At 460, the miner evaluates the proposal transactions in the candidate blocks for the cluster using a predetermined selection algorithm that will yield the same proposal transaction selection in each miner in the cluster.

Figure 4D:
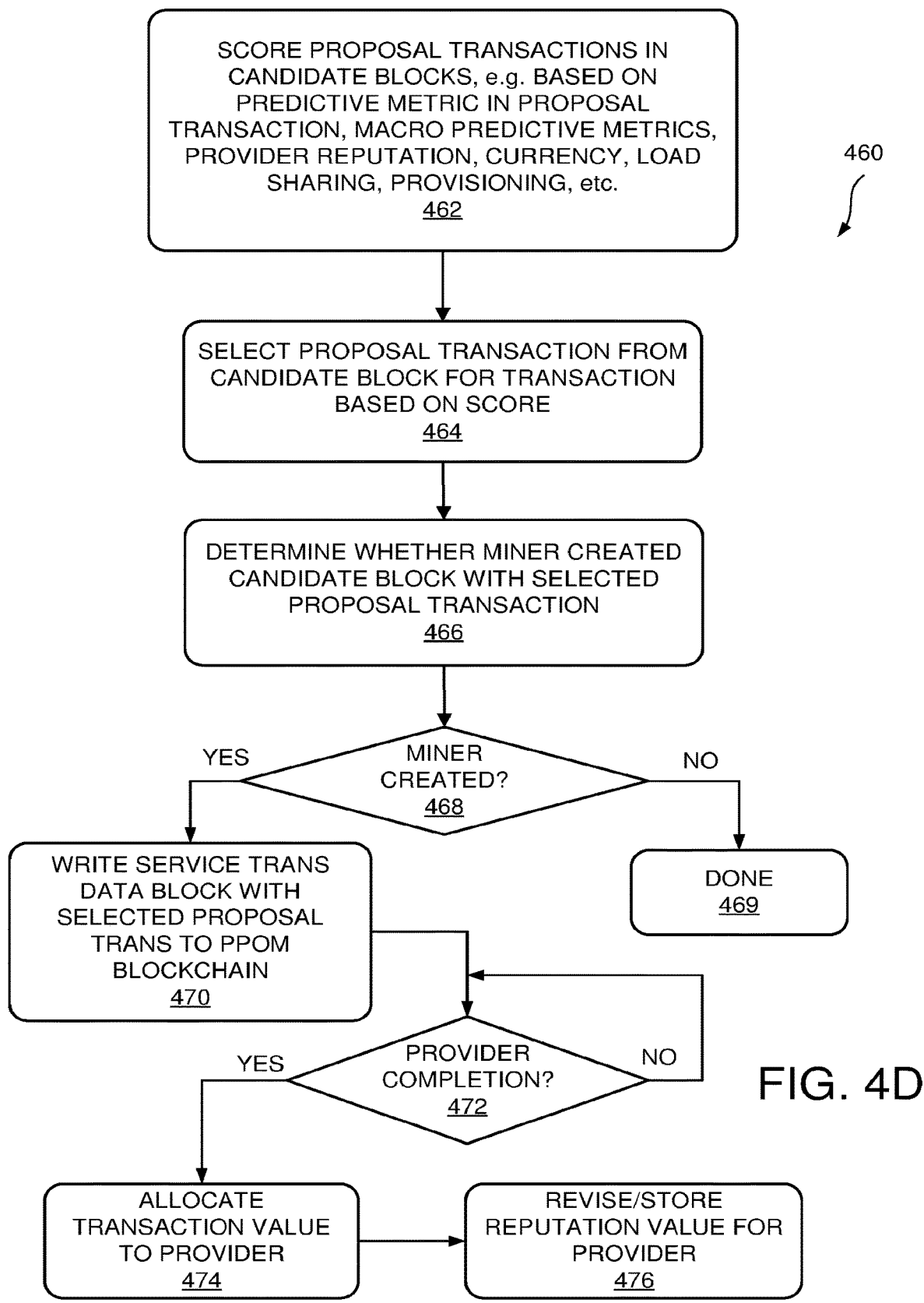
FIG. 4D is a control flow diagram showing an illustrative example of a candidate block evaluation process in a miner node for selecting a provider in a predictive metrics based consensus protocol in accordance with the disclosed technology.

FIG. 4D is a control flow diagram showing an illustrative example of a candidate block evaluation process 460 in a miner node for selecting a proposal transaction from a provider in a predictive metrics based consensus protocol in accordance with the disclosed technology.

In this example, at 462, the proposal transactions in the candidate blocks are scored. This scoring can be based on parameters in proposal transaction based on predictive metrics or macro predictive metrics as well as provider reputation, currency, load sharing, provisioning, or other criteria, to determine a reputation score for a proposal transaction. In one simplified example, the block reputation value can be the sum of the individual provider reputations of all proposal transactions in the candidate block.

For example, an individual provider reputation can be a value x where 0<x<1. In a simplified example for individual provider reputation, if a provider won M bids, and successfully carried out K bids, its reputation value would be K/M. However, block reputation can be more involved in more complex examples in order to prevent provider starvation and obtain fairness of distribution to providers.

Examples of some parameters that could be used in more complex block reputation determinations may involve: (a) The amount of PPOM currency the entire block commands; (b) The sum of reputation of each provider listed in each transaction in a block (as described for a basic example above); (c) The number of chances the providers in the block have had (for purposes of fairness); (d) Provisioning fees; and (e) The number of separate providers whose entries are in the block, for purposes of fairness in service provider distribution.

At 464, a proposal transaction in a candidate block is selected based on the scores from step 462. As noted above, miners can use the same function to calculate block reputation so that the same proposal transaction is selected by all miners in a cluster as the next service transaction data block to be written to the PPOM service transaction blockchain. Note that the proposal transactions that are not selected can be dropped because the service has not been rendered yet, unlike payment transactions on a blockchain where value will already have been transferred.

At 466, the miner determines whether it created the selected candidate block. For example, the miner can determine whether a miner signature in the selected candidate block indicates that the miner signed the block. At 468, if the miner created the block, then control branches to 470 to write the selected candidate block to the PPOM blockchain.

As noted above, in some examples, the proposal transactions provided by the providers 122 can take the form of a potential service transaction data block, e.g. block 242 in FIG. 2B. In this case, the proposal transaction can be written to the PPOM service transaction blockchain, e.g. blockchain 140 or 240. In other examples, the miner can take information from the selected proposal transaction and use it to create a service transaction data block. In either case, a service transaction data block with the proposal transaction information is written to the PPOM service transaction blockchain.

When a service transaction data block is written to a service transaction blockchain, as described above, a miner can receive or "win" an amount of currency, which can provide an incentive for the miner to participate in the selection protocol. The miner can also share a portion of the won currency with the providers in the form of provisioning fees. This can be negotiated between the miner and each provider.

In this example, at 472, the miner checks for the Provider_completion flag to be set in the service transaction data block written to the PPOM blockchain. If the flag is set, then, at 474, the miner allocates transaction value to the provider the serviced the client service request. In this example, the reputation value for the provider can also be revised and stored.

If a provider fails to carry out the promised contract, a failed transaction can be written to the PPOM service transaction blockchain. The provider's reputation can be reduced by an amount or percentage. Miners can recalculate the reputation of a provider at the end of a configurable number of request broadcast cycles.

When a provider fails to provide service, the miner's reputation can also be reduced leading to less requests coming the miner's way. Eventually, all reputation of a miner can be lost if a miner persists with a faulty provider. The maximum limit on how much a miner can tolerate a faulty provider can be configurable for the miner.

Figure 4E:
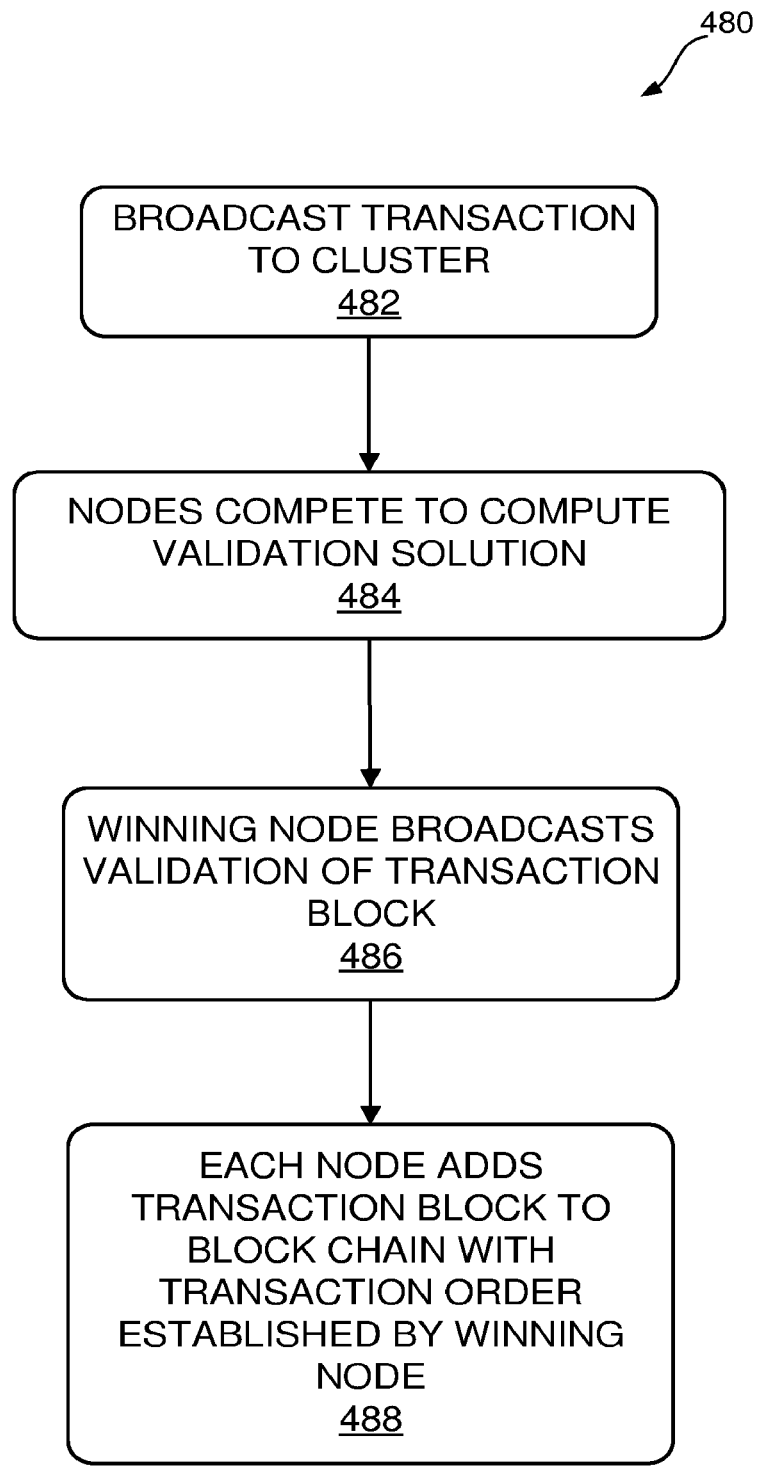
FIG. 4E is a control flow diagram illustrating an example of a validation process for service transaction data blocks added to the service transaction blockchain distributed to untrusted nodes.

FIG. 4E is a control flow diagram illustrating an example of a validation process 480 for blocks added to the PPOM service transaction blockchain ledger implemented using untrusted blockchain nodes. In process 480, when a service transaction data block 142 is created for PPOM service transaction blockchain 140 in FIG. 1, the transaction is broadcast, at 482, to the cluster of untrusted nodes. At 484, nodes compete to compute a validation solution for the transaction. At 486, a winning node broadcasts the validation solution for the service transaction data block and adds the data block to its copy of the PPOM service transaction data blockchain 140 in FIG. 1.

At 488, in response to the winning node's broadcast, the other nodes add the service transaction data block to their copies of the PPOM service transaction blockchain ledger in the transaction order established by the winning node. The decentralized validation protocol can maintain the integrity, immutability and security of the PPOM service transaction blockchain ledger.

It should be appreciated that the processes shown for examples and a variety of other approaches may be utilized without departing from the disclosed technology. Depending upon the scripting capabilities of the blockchain platform, the methods or function in the data blocks of the PPOM service transaction data blockchain may include more extensive code execution.

Figure 5:
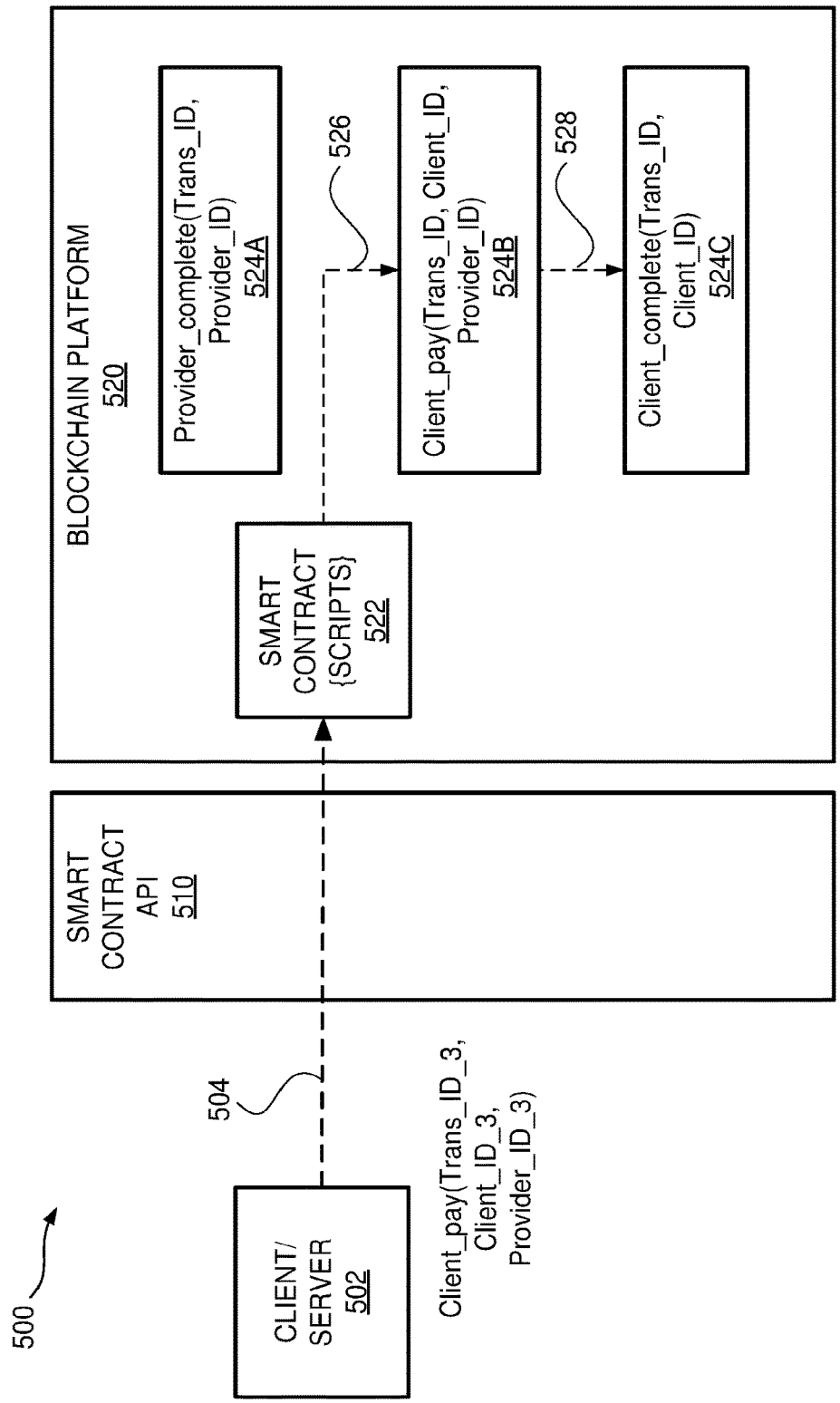
FIG. 5 is a data architecture diagram showing an illustrative example of a user using an application programming interface to invoke methods in a service transaction data block on a service transaction blockchain in accordance with the disclosed technology.

FIG. 5 is a data architecture diagram showing an illustrative example of an interface for initiating execution of smart contract scripts on a blockchain platform, such as the transaction data blocks in FIGS. 1, 2A, 2B and 3B. In this example, an Application Program Interface (API) 510 provides an interface to the blockchain platform 520 that supports the PPOM service transaction data blockchain. The blockchain platform 520 supports a smart contract 522, such as service transaction data block 242 in FIG. 2B, which includes scripts 524 with code that, when executed by the blockchain platform 520, perform function call operations with respect to the PPOM service transaction data blockchain.

In the example of FIG. 5, three scripts are shown in a smart contract 522, such as service transaction data block 242 in FIG. 2B. In this example, client/server 502 initiates a transaction on the PPOM service transaction data blockchain that causes Client_pay( ) function 524B to execute, at 526, and transfer payment to a provider. If the payment transfer is successful, then the Client_complete( ) function is called from the Client_pay( ) function, at 528, to set the Client_completion flag in the service transaction data block for the service transaction.

A provider can use API 510 to invoke the Provider_complete( ) function to set the Provider_completion flag. The functions are executed in an execution framework on blockchain platform 520, to manage service transactions on a PPOM service transaction blockchain.

Blockchain Ledger Data Structure

Figure 6A:
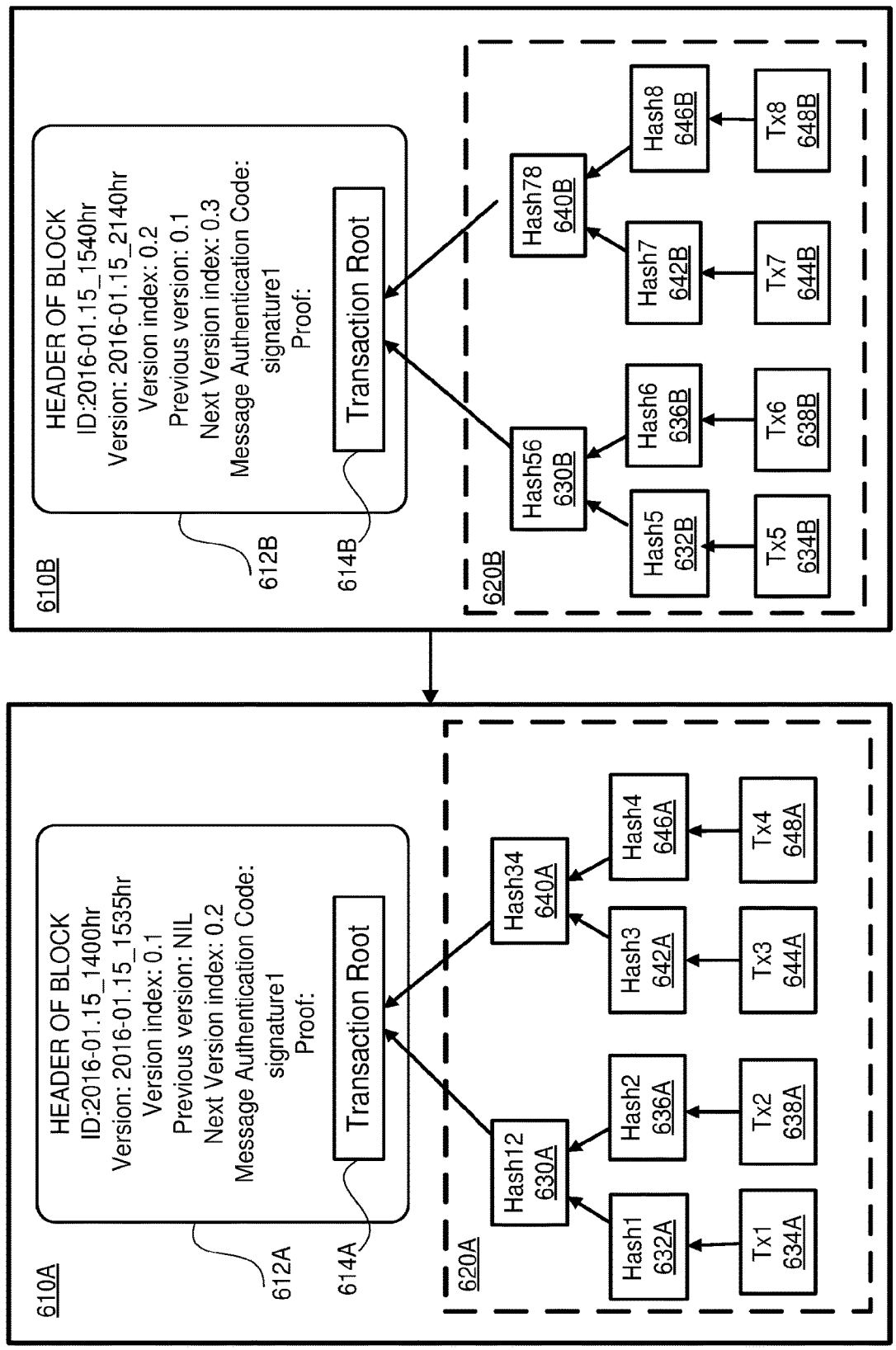
FIG. 6A is a data architecture diagram illustrating a simplified example of a blockchain ledger based on the service transaction data blocks of the service transaction blockchain of FIG. 1.

FIG. 6A is a data architecture diagram illustrating a simplified example of a blockchain ledger 600 based on the blocks 142A-E of the PPOM service transaction data blockchain 140 of FIG. 1. The blockchain ledger 600 example of FIG. 6A is simplified to show block headers, metadata and signatures of blocks 142A-E in order to demonstrate a secure transaction data or access rule ledger using a blockchain. In outline, a blockchain ledger may be a globally shared transactional database.

FIG. 6A is an illustrative example of a blockchain ledger 600 with a data tree holding transaction data that is verified using cryptographic techniques. In FIG. 6A, each block 610 includes a block header 612 with information regarding previous and subsequent blocks and stores a transaction root node 614 to a data tree 620 holding transactional data. Transaction data may store smart contracts, data related to transactions, or any other data. The elements of smart contracts may also be stored within transaction nodes of the blocks.

In the example of FIG. 6A, a Merkle tree 620 is used to cryptographically secure the transaction data. For example, Transaction Tx1 node 634A of data tree 620A of block 610A can be hashed to Hash1 node 632A, Transaction Tx2 node 638A may be hashed to Hash2 node 636A. Hash1 node 632A and Hash2 node 636A may be hashed to Hash12 node 630A. A similar subtree may be formed to generate Hash34 node 640A. Hash12 node 630A and Hash34 node 640A may be hashed to Transaction Root 614A hash sorted in the data block 610A. By using a Merkle tree, or any similar data structure, the integrity of the transactions may be checked by verifying the hash is correct.

Figure 6B:
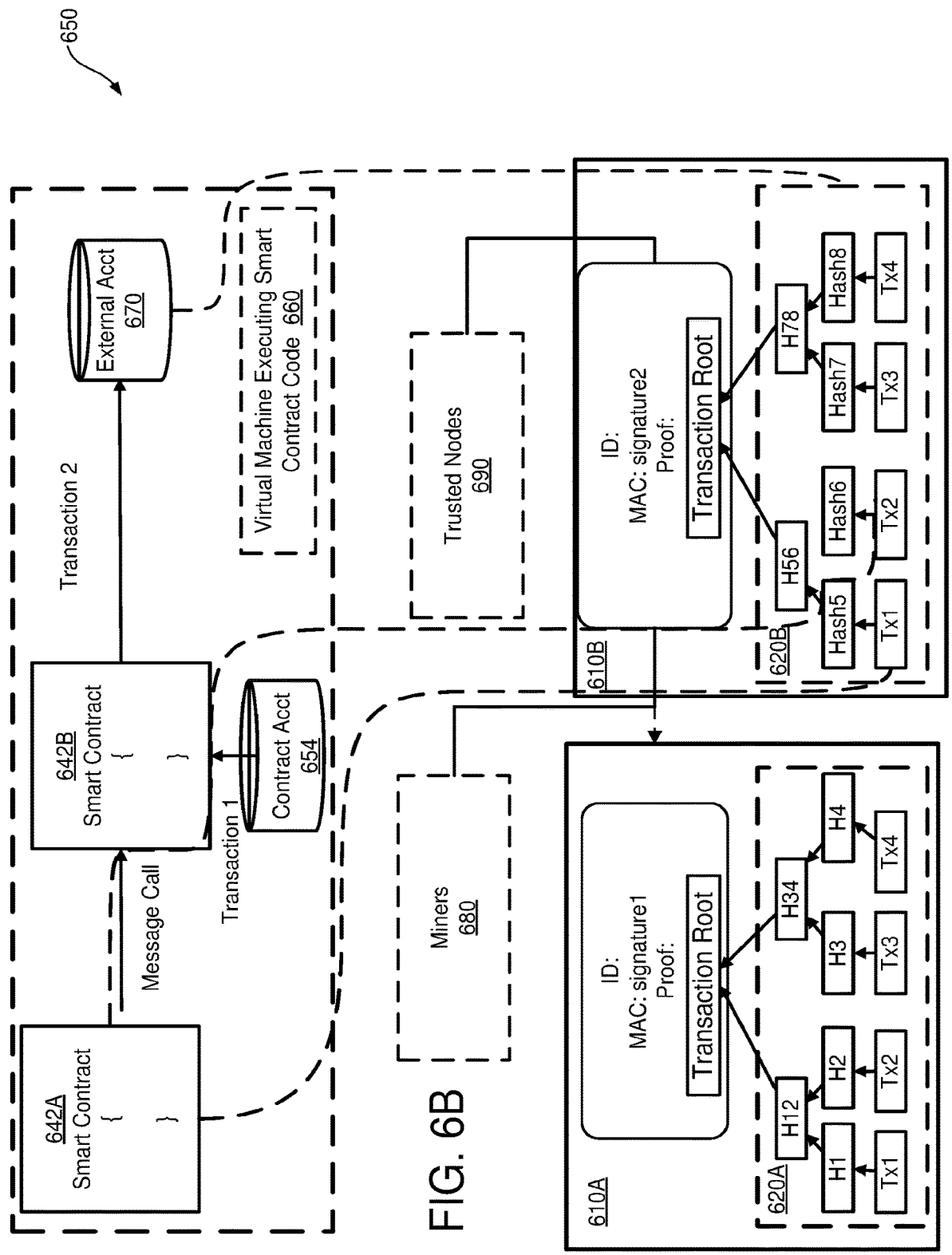
FIG. 6B is a data architecture diagram showing an illustrative example of smart contract code, transactions and messages that are bundled into a block so that their integrity is cryptographically secure and so that they may be appended to a blockchain ledger.

FIG. 6B is a data architecture diagram showing an illustrative example of smart contract code, transactions and messages that are bundled into a block so that their integrity is cryptographically secure and so that they may be appended to a blockchain ledger. In FIG. 6B, smart contracts 642 are code that executes on a computer. More specifically, the code of a smart contract may be stored in a blockchain ledger and executed by nodes of a distributed blockchain platform at a given time. The result of the smart code execution may be stored in a blockchain ledger. Optionally, a currency may be expended as smart contract code is executed. In the example of FIG. 6B, smart contracts 642 are executed in a virtual machine environment, although this is optional.

In FIG. 6B, the aspects of smart contracts 642 are stored in transaction data nodes in data tree 620 in the blocks 610 of the blockchain ledger of FIG. 6A. In the example of FIG. 6B, Smart contract 642A is stored in data block Tx1 node 634A of data tree 620A in block 610A, Smart contract 642B is stored in Tx2 node 638A, Contract Account 654 associated with Smart contract 642B is stored in Tx3 node 644A, and External Account is stored in Tx4 node 648A.

Storage of Smart Contracts and Transaction Data in the Blockchain Ledger

To ensure the smart contracts are secure and generate secure data, the blockchain ledger must be kept up to date. For example, if a smart contract is created, the code associated with a smart contract must be stored in a secure way. Similarly, when smart contract code executes and generates transaction data, the transaction data must be stored in a secure way.

In the example of FIG. 6B, two possible embodiments for maintenance of the blockchain ledger are shown. In one embodiment, untrusted miner nodes ("miners") 680 may be rewarded for solving a cryptographic puzzle and thereby be allowed to append a block to the blockchain. Alternatively, a set of trusted nodes 690 may be used to append the next block to the blockchain ledger. Nodes may execute smart contract code, and then one winning node may append the next block to a blockchain ledger.

Though aspects of the technology disclosed herein resemble a smart contract, in the present techniques, the policy of the contract may determine the way that the blockchain ledger is maintained. For example, the policy may require that the validation or authorization process for blocks on the ledger is determined by a centralized control of a cluster of trusted nodes. In this case, the centralized control may be a trusted node, such as Certificate Authority 110, authorized to attest and sign the transaction blocks to validate them and validation by miners may not be needed.

Alternatively, the policy may provide for validation process decided by a decentralized cluster of untrusted nodes. In the situation where the blockchain ledger is distributed to a cluster of untrusted nodes, mining of blocks in the chain may be employed to validate the blockchain ledger.

Blockchains may use various time-stamping schemes, such as proof-of-work, to serialize changes. Alternate consensus methods include proof-of-stake, proof-of-burn, proof-of-research may also be utilized to serialize changes.

As noted above, in some examples, a blockchain ledger may be validated by miners to secure the blockchain. In this case, miners may collectively agree on a validation solution to be utilized. However, if a small network is utilized, e.g. private network, then the solution may be a Merkle tree and mining for the validation solution may not be required. When a transaction block is created, e.g. a transaction data block 142 for transaction data blockchain 140 or an permissions control rule block 152 for permissions control policy blockchain 150, the block is an unconfirmed and unidentified entity. To be part of the acknowledged "currency", it may be added to the blockchain, and therefore relates to the concept of a trusted cluster.

In a trusted cluster, when a data block 142, every node competes to acknowledge the next "transaction" (e.g. a new service transaction data block). In one example, the nodes compete to mine and get the lowest hash value: min{previous_hash, contents_hash, random_nonce_to_be_guessed}→result. Transaction order is protected by the computational race (faith that no one entity can beat the collective resources of the blockchain network). Mutual authentication parameters are broadcast and acknowledged to prevent double entries in the blockchain.

Alternatively, by broadcasting the meta-data for authenticating a secure ledger across a restricted network, e.g. only the signed hash is broadcast, the blockchain may reduce the risks that come with data being held centrally. Decentralized consensus makes blockchains suitable for the recording of secure transactions or events. The meta-data, which may contain information related to the data file, may also be ciphered for restricted access so that the meta-data does not disclose information pertaining to the data file.

The mining process, such as may be used in concert with the validation process 480 of FIG. 4E, may be utilized to deter double accounting, overriding or replaying attacks, with the community arrangement on the agreement based on the "good faith" that no single node can control the entire cluster. A working assumption for mining is the existence of equivalent power distribution of honest parties with supremacy over dishonest or compromised ones. Every node or miner in a decentralized system has a copy of the blockchain. No centralized "official" copy exists and no user is "trusted" more than any other. Transactions are broadcast, at 482, to the network using software. Mining nodes compete, at 484, to compute a validation solution to validate transactions, and then broadcast, at 486, the completed block validation to other nodes. Each node adds the block, at 488, to its copy of the blockchain with transaction order established by the winning node.

Note that in a restricted network, stake-holders who are authorized to check or mine for the data file may or may not access the transaction blocks themselves, but would generally need to have keys to the meta-data (since they are members of the restricted network, and are trusted) to get the details. As keys are applied on data with different data classifications, the stake-holders can be segmented.

A decentralized blockchain may also use ad-hoc secure message passing and distributed networking. In this example, the blockchain ledger may be different from a conventional blockchain in that there is a centralized clearing house, e.g. authorized central control for validation. Without the mining process, the trusted cluster can be contained in a centralized blockchain instead of a public or democratic blockchain. One way to view this is that a decentralized portion is as "democratic N honest parties" (multiparty honest party is a cryptography concept), and a centralized portion as a "trusted monarchy for blockchain information correction". For example, there may be advantages to maintaining the data file as centrally authorized and kept offline.

In some examples, access to a resource on a blockchain can be restricted by cryptographic means to be only open to authorized servers. Since the transaction data policy blockchain ledger is distributed, the authorized servers can validate it. A public key may be used as an address on a public blockchain ledger.

Note that growth of a decentralized blockchain may be accompanied by the risk of node centralization because the computer resources required to operate on bigger data become increasingly expensive.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approach involving a predictive metrics based consensus protocol for routing client service transactions to service providers using a PPOM service transaction blockchain in accordance with the disclosed technology. The specific examples of different aspects of predictive metrics based consensus protocol for routing client service transactions to service providers using a PPOM service transaction blockchain in accordance with the disclosed technology described herein are illustrative and are not intended to limit the scope of the techniques shown.

Smart Contracts

Smart contracts are defined by code. As described previously, the terms and conditions of the smart contract may be encoded (e.g., by hash) into a blockchain ledger. Specifically, smart contracts may be compiled into a bytecode (if executed in a virtual machine), and then the bytecode may be stored in a blockchain ledger as described previously. Similarly, transaction data executed and generated by smart contracts may be stored in the blockchain ledger in the ways previously described.

Computer Architectures for Use of Smart Contracts and Blockchain Ledgers

Figure 8:
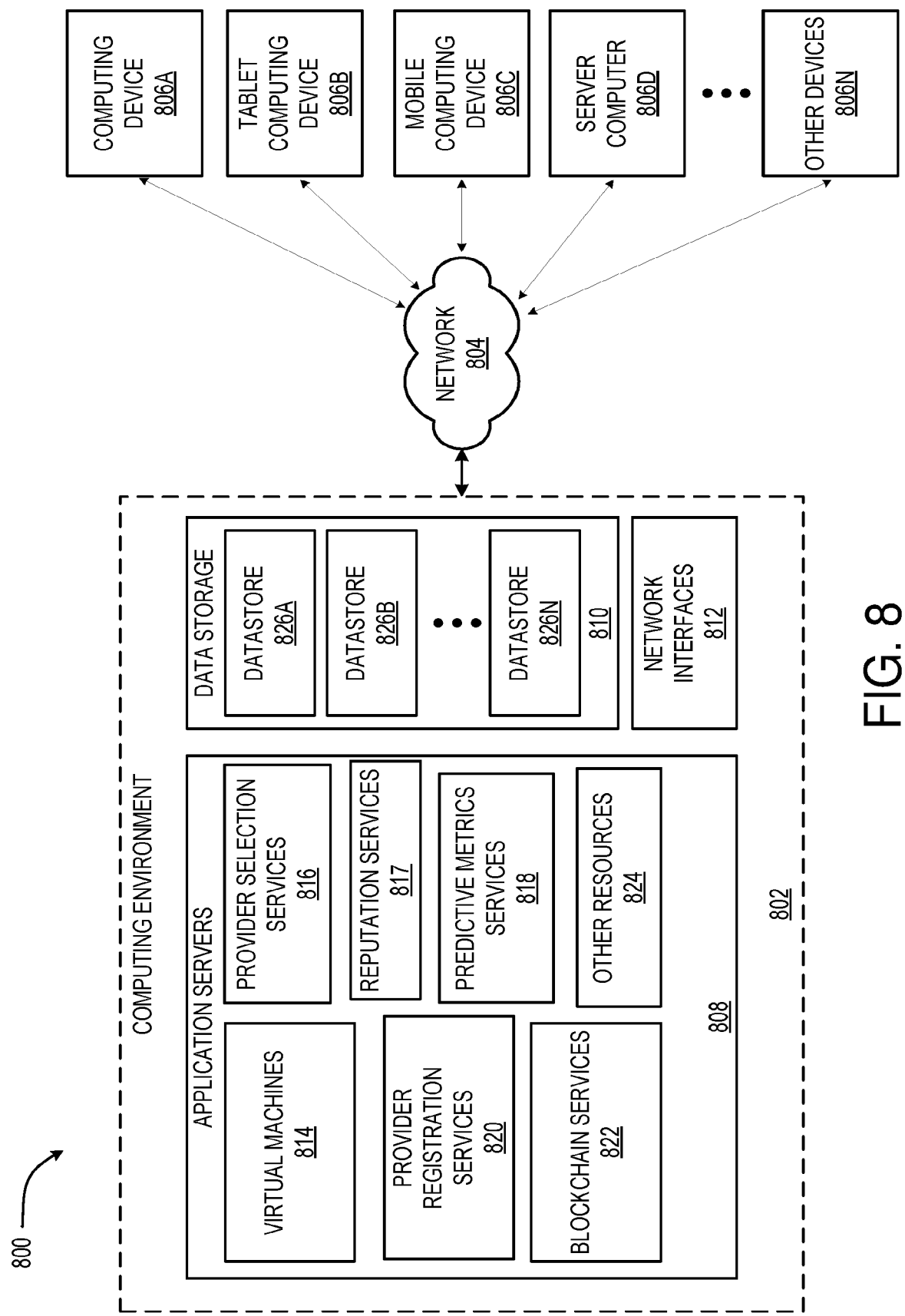
FIG. 8 is a diagram illustrating a distributed computing environment capable of implementing aspects of the techniques and technologies presented herein.

Note that at least parts of processes 400, 420, 440, 460 and 480 of FIGS. 4A-E, the scripts of service transaction data block 242 of FIG. 2B, smart contract 522 of FIG. 5, smart contracts 642 of FIG. 6B, and other processes and operations pertaining to PPOM service transaction blockchain ledgers described herein may be implemented in one or more servers, such as computer environment 800 in FIG. 8, or the cloud, and data defining the results of user control input signals translated or interpreted as discussed herein may be communicated to a user device for display. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines (e.g. processes 400, 420, 440, 460 and 480 of FIGS. 4A-E, the scripts of service transaction data block 242 of FIG. 2B, smart contract 522 of FIG. 5, smart contracts 642 of FIG. 6B) are described herein as being implemented, at least in part, by an application, component, and/or circuit. Although the following illustration refers to the components of FIGS. 1, 2B, 4A-E, 5 and 6B, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of the FIGURES discussed above, it can be appreciated that the operations of the routines (e.g. processes 400, 420, 440, 460 and 480 of FIGS. 4A-E, the scripts of service transaction data block 242 of FIG. 2B, smart contract 522 of FIG. 5, smart contracts 642 of FIG. 6B) may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 7:
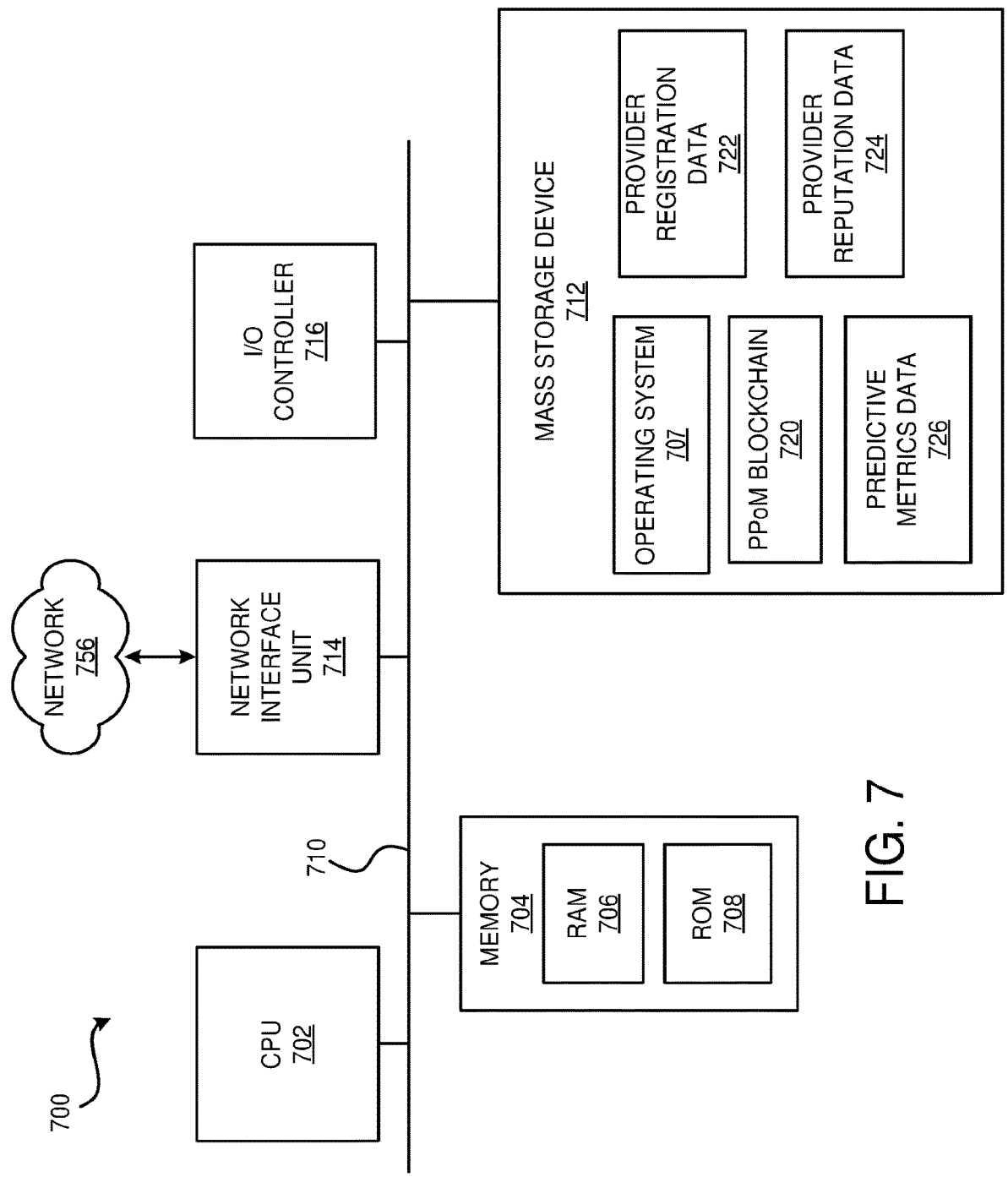
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a computer, such as the devices 110, 120A-C and 122A-H (FIG. 1), capable of executing the program components described herein. Thus, the computer architecture 700 illustrated in FIG. 7 illustrates an architecture for a server computer, mobile phone, a PDA, a smart phone, a desktop computer, a netbook computer, a tablet computer, an on-board computer, a game console, and/or a laptop computer. The computer architecture 700 may be utilized to execute any aspects of the software components presented herein.

The computer architecture 700 illustrated in FIG. 7 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between sub-elements within the computer architecture 700, such as during startup, is stored in the ROM 708. The computer architecture 700 further includes a mass storage device 712 for storing an operating system 707, data (such as a copy of PPOM service transaction blockchain data 720, provider registration data 722, provider reputation data 724, and predictive metrics data 726), and one or more application programs.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes the claims, the phrase "computer storage medium," "computer-readable storage medium" and variations thereof, does not include waves, signals, and/or other transitory and/or intangible communication media, per se.

According to various configurations, the computer architecture 700 may operate in a networked environment using logical connections to remote computers through the network 756 and/or another network (not shown). The computer architecture 700 may connect to the network 756 through a network interface unit 714 connected to the bus 710. It should be appreciated that the network interface unit 714 also may be utilized to connect to other types of networks and remote computer systems. The computer architecture 700 also may include an input/output controller 716 for receiving and processing input from a number of other devices, including a keyboard, mouse, game controller, television remote or electronic stylus (not shown in FIG. 7). Similarly, the input/output controller 716 may provide output to a display screen, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

FIG. 8 depicts an illustrative distributed computing environment 800 capable of executing the software components described herein for a predictive metrics based consensus protocol for routing client service transactions to service providers using a PPOM service transaction blockchain in accordance with the disclosed technology. Thus, the distributed computing environment 800 illustrated in FIG. 8 can be utilized to execute many aspects of the software components presented herein. For example, the distributed computing environment 800 can be utilized to execute one or more aspects of the software components described herein. Also, the distributed computing environment 800 may represent components of the distributed blockchain platform discussed above.

According to various implementations, the distributed computing environment 800 includes a computing environment 802 operating on, in communication with, or as part of the network 804. The network 804 may be or may include the network 856, described above. The network 804 also can include various access networks. One or more client devices 806A-806N (hereinafter referred to collectively and/or generically as "clients 806") can communicate with the computing environment 802 via the network 804 and/or other connections (not illustrated in FIG. 8). In one illustrated configuration, the clients 806 include a computing device 806A, such as a laptop computer, a desktop computer, or other computing device; a slate or tablet computing device ("tablet computing device") 806B; a mobile computing device 806C such as a mobile telephone, a smart phone, an on-board computer, or other mobile computing device; a server computer 806D; and/or other devices 806N, which can include a hardware security module. It should be understood that any number of devices 806 can communicate with the computing environment 802. Two example computing architectures for the devices 806 are illustrated and described herein with reference to FIGS. 7 and 8. It should be understood that the illustrated devices 806 and computing architectures illustrated and described herein are illustrative only and should not be construed as being limited in any way.

In the illustrated configuration, the computing environment 802 includes application servers 808, data storage 810, and one or more network interfaces 812. According to various implementations, the functionality of the application servers 808 can be provided by one or more server computers that are executing as part of, or in communication with, the network 804. The application servers 808 can host various services, virtual machines, portals, and/or other resources. In the illustrated configuration, the application servers 808 host one or more virtual machines 814 for hosting applications or other functionality. According to various implementations, the virtual machines 814 host one or more applications and/or software modules for a data management blockchain ledger. It should be understood that this configuration is illustrative only and should not be construed as being limiting in any way.

The application servers 808 can also host provider selection services functionality module 816, such as provider selection management 381 described with respect to FIG. 3C. Provider selection management module 816 can utilize predictive metrics data and reputation data relating to providers in performing a predictive metrics based consensus protocol for routing client service transactions to service providers executing in virtual machines 814.

The application servers 808 can also host reputation data services functionality module 818, such as the reputation engine 384 described with respect to FIG. 3C. Reputation services module 817 can collect, manage and provide reputation data relating to providers, such as providers 122A-H in FIG. 1 and FIG. 3A, for use in provider selection management services 816.

The application servers 808 can also host predictive metrics services functionality module 818, such as the macro prediction engine 382 described with respect to FIG. 3C. Predictive metrics services module 817 can collect, manage and provide predictive metrics data relating to providers, such as providers 122A-H in FIG. 1 and FIG. 3A, for use in provider selection management services 816.

According to various implementations, the application servers 808 also include one or more provider registration services 820 and one or more blockchain services 822. The provider registration services 820 can include services for managing registration of providers, such as providers 122A-H in FIG. 1 and FIG. 3A, with one or more miners.

Blockchain services 822 can include services for managing service transaction data on a PPOM service transaction data blockchain, such as PPOM service transaction data blockchain 140 in FIG. 1. The blockchain services 822 can include services for participating in management of one or more blockchains, such as by creating genesis blocks and service transaction data blocks, and performing validation.

As shown in FIG. 8, the application servers 808 also can host other services, applications, portals, and/or other resources ("other resources") 824. The other resources 824 can include, but are not limited to, data encryption, data sharing, or any other functionality.

As mentioned above, the computing environment 802 can include data storage 810. According to various implementations, the functionality of the data storage 810 is provided by one or more databases or data stores operating on, or in communication with, the network 804. The functionality of the data storage 810 also can be provided by one or more server computers configured to host data for the computing environment 802. The data storage 810 can include, host, or provide one or more real or virtual data stores 826A-826N (hereinafter referred to collectively and/or generically as "datastores 826"). The datastores 826 are configured to host data used or created by the application servers 808 and/or other data. Aspects of the datastores 826 may be associated with services for a PPOM services transaction blockchain. Although not illustrated in FIG. 8, the datastores 826 also can host or store web page documents, word documents, presentation documents, data structures, algorithms for execution by a recommendation engine, and/or other data utilized by any application program or another module.

The computing environment 802 can communicate with, or be accessed by, the network interfaces 812. The network interfaces 812 can include various types of network hardware and software for supporting communications between two or more computing devices including, but not limited to, the clients 806 and the application servers 808. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 may provide the software functionality described herein as a service to the clients using devices 806. It should be understood that the devices 806 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 800 to utilize the functionality described herein for creating and supporting a PPOM services transaction blockchain ledger, among other aspects.

Figure 9:
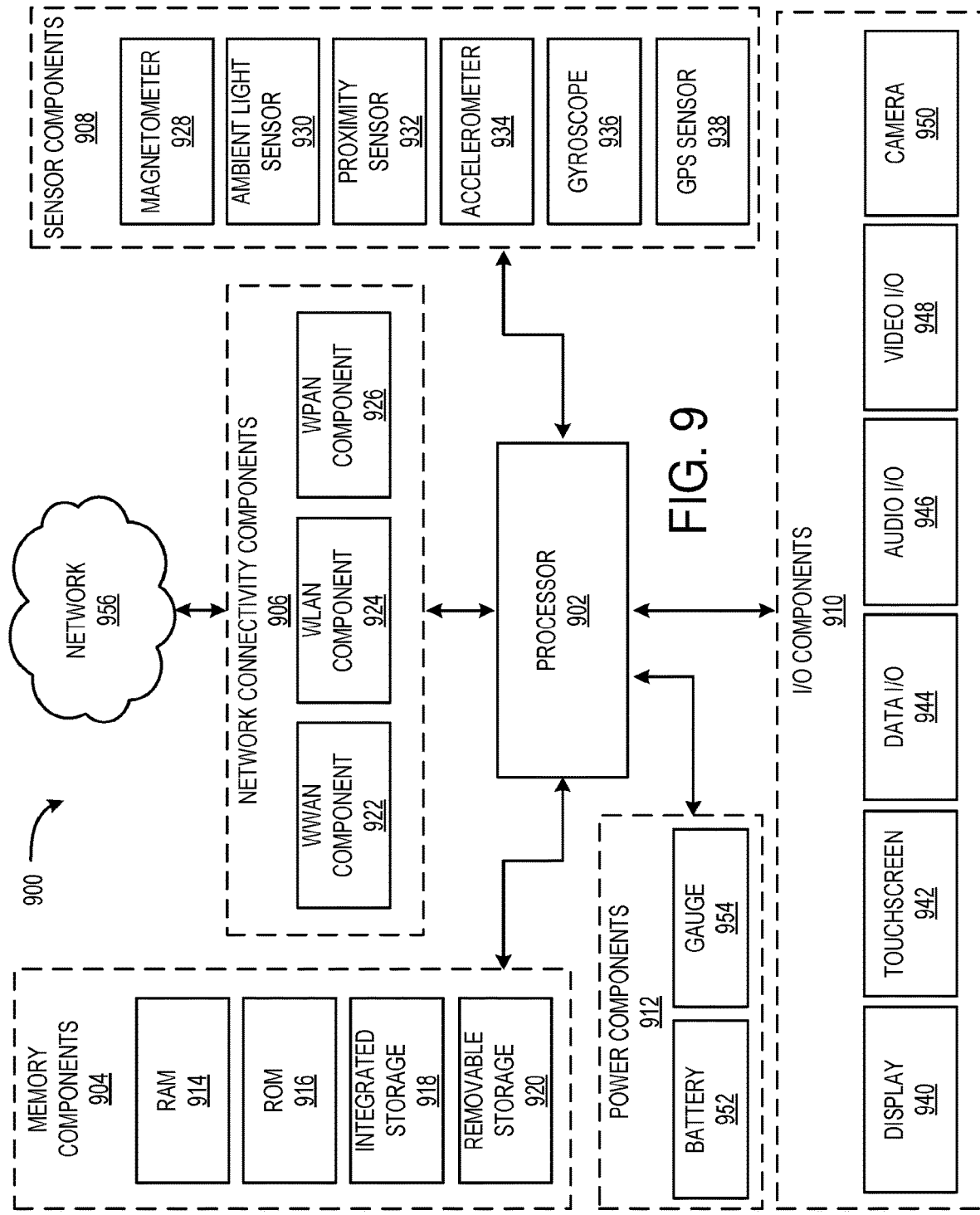
FIG. 9 is a computer architecture diagram illustrating a computing device architecture for a computing device capable of implementing aspects of the techniques and technologies presented herein.

Turning now to FIG. 9, an illustrative computing device architecture 900 for a computing device that is capable of executing various software components is described herein for supporting a blockchain ledger. The computing device architecture 900 is applicable to computing devices that can manage a blockchain ledger. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 900 is applicable to the Client 110, miners 120A-C, providers 122A-H, and blockchain platform 130 shown in FIG. 1 and computing devices 806A-N shown in FIG. 8.

The computing device architecture 900 illustrated in FIG. 9 includes a processor 902, memory components 904, network connectivity components 906, sensor components 908, input/output components 910, and power components 912. In the illustrated configuration, the processor 902 is in communication with the memory components 904, the network connectivity components 906, the sensor components 908, the input/output ("I/O") components 910, and the power components 912. Although no connections are shown between the individual components illustrated in FIG. 9, the components can interact to carry out device functions. In some configurations, the components are arranged so as to communicate via one or more busses (not shown).

The processor 902 includes a central processing unit ("CPU") configured to process data, execute computer-executable instructions of one or more application programs, and communicate with other components of the computing device architecture 900 in order to perform various functionality described herein. The processor 902 may be utilized to execute aspects of the software components presented herein and, particularly, those that utilize, at least in part, secure data.

In some configurations, the processor 902 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620P, 1080P, and higher resolution), video games, three-dimensional ("3D") modeling applications, and the like. In some configurations, the processor 902 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 902 is, or is included in, a system-on-chip ("SoC") along with one or more of the other components described herein below. For example, the SoC may include the processor 902, a GPU, one or more of the network connectivity components 906, and one or more of the sensor components 908. In some configurations, the processor 902 is fabricated, in part, utilizing a package-on-package ("PoP") integrated circuit packaging technique. The processor 902 may be a single core or multi-core processor.

The processor 902 may be created in accordance with an ARM architecture, available for license from ARM HOLDINGS of Cambridge, United Kingdom. Alternatively, the processor 902 may be created in accordance with an x86 architecture, such as is available from INTEL CORPORATION of Mountain View, California and others. In some configurations, the processor 902 is a SNAPDRAGON SoC, available from QUALCOMM of San Diego, California, a TEGRA SoC, available from NVIDIA of Santa Clara, California, a HUMMINGBIRD SoC, available from SAMSUNG of Seoul, South Korea, an Open Multimedia Application Platform ("OMAP") SoC, available from TEXAS INSTRUMENTS of Dallas, Texas, a customized version of any of the above SoCs, or a proprietary SoC.

The memory components 904 include a random access memory ("RAM") 914, a read-only memory ("ROM") 916, an integrated storage memory ("integrated storage") 918, and a removable storage memory ("removable storage") 920. In some configurations, the RAM 914 or a portion thereof, the ROM 916 or a portion thereof, and/or some combination of the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 and/or the removable storage 920.

The integrated storage 918 can include a solid-state memory, a hard disk, or a combination of solid-state memory and a hard disk. The integrated storage 918 may be soldered or otherwise connected to a logic board upon which the processor 902 and other components described herein also may be connected. As such, the integrated storage 918 is integrated in the computing device. The integrated storage 918 is configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available as a total combined storage capacity. In some configurations, the total combined capacity of the integrated storage 918 and the removable storage 920 is shown to a user instead of separate storage capacities for the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSOFT AZURE from Microsoft Corporation of Redmond, Washington or AWS from Amazon Corporation of Seattle, Washington. The operating system may also include WINDOWS MOBILE OS from Microsoft Corporation of Redmond, Washington, WINDOWS PHONE OS from Microsoft Corporation, WINDOWS from Microsoft Corporation, MAC OS or IOS from Apple Inc. of Cupertino, California, and ANDROID OS from Google Inc. of Mountain View, California. Other operating systems are contemplated.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from the network 956 or another network, which may be a WWAN, a WLAN, or a WPAN. Although only the network 956 is illustrated, the network connectivity components 906 may facilitate simultaneous communication with multiple networks, including the network 956 of FIG. 9. For example, the network connectivity components 906 may facilitate simultaneous communications with multiple networks via one or more of a WWAN, a WLAN, or a WPAN.

The network 956 may be or may include a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 956 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 956 may be configured to provide voice and/or data communications with any combination of the above technologies. The network 956 may be configured to or be adapted to provide voice and/or data communications in accordance with future generation technologies.

In some configurations, the WWAN component 922 is configured to provide dual-multi-mode connectivity to the network 956. For example, the WWAN component 922 may be configured to provide connectivity to the network 956, wherein the network 956 provides service via GSM and UMTS technologies, or via some other combination of technologies. Alternatively, multiple WWAN components 922 may be utilized to perform such functionality, and/or provide additional functionality to support other non-compatible technologies (i.e., incapable of being supported by a single WWAN component). The WWAN component 922 may facilitate similar connectivity to multiple networks (e.g., a UMTS network and an LTE network).

The network 956 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 956 via the WI-FI access points. Such connections may be secured via various encryption technologies including, but not limited to, WI-FI Protected Access ("WPA"), WPA2, Wired Equivalent Privacy ("WEP"), and the like.

The network 956 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 928, an ambient light sensor 930, a proximity sensor 932, an accelerometer 934, a gyroscope 936, and a Global Positioning System sensor ("GPS sensor") 938. It is contemplated that other sensors, such as, but not limited to, temperature sensors or shock detection sensors, also may be incorporated in the computing device architecture 900.

The I/O components 910 include a display 940, a touchscreen 942, a data I/O interface component ("data I/O") 944, an audio I/O interface component ("audio I/O") 946, a video I/O interface component ("video I/O") 948, and a camera 950. In some configurations, the display 940 and the touchscreen 942 are combined. In some configurations two or more of the data I/O component 944, the audio I/O component 946, and the video I/O component 948 are combined. The I/O components 910 may include discrete processors configured to support the various interfaces described below or may include processing functionality built-in to the processor 902.

The illustrated power components 912 include one or more batteries 952, which can be connected to a battery gauge 954. The batteries 952 may be rechargeable or disposable. Rechargeable battery types include, but are not limited to, lithium polymer, lithium ion, nickel cadmium, and nickel metal hydride. Each of the batteries 952 may be made of one or more cells.

The power components 912 may also include a power connector, which may be combined with one or more of the aforementioned I/O components 910. The power components 912 may interface with an external power system or charging equipment via an I/O component.

Examples of Various Implementations

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The present disclosure is made in light of the following clauses:

Clause 1. A computer-implemented method for a predictive metrics based consensus protocol for routing client service transactions to service providers using a service transaction blockchain, the method comprising: receiving a client service request; forwarding the client service request to a set of service providers; receiving one or more proposal transactions from the set of service providers; scoring the one or more proposal transactions based on a predictive metric; determining a final proposal transaction based on the scoring; and writing the final proposal transaction to a service transaction blockchain.

Clause 2. The method of Clause 1, where the method includes: creating a first candidate block in a first miner having at least one of the proposal transactions; sending the first candidate block to a second miner; receiving a second candidate block from the second miner; and the step of scoring the one or more proposal transactions based on the predictive metric comprises scoring the one or more proposal transactions in the first candidate block and the second candidate block based on the predictive metric.

Clause 3. The method of Clause 2, wherein the predictive metric comprises a macro predictive metric determined in one of the miners.

Clause 4. The method of Clause 2, where the method includes: selecting the first miner as a selected miner when a score of the first candidate block is greater than a score of the second candidate block and selecting the second miner as the selected miner when the score of the second candidate block is greater than a score of the first candidate block; and the step of writing, by the selected miner, the final proposal transaction to a service transaction blockchain.

Clause 5. The method of Clause 1, where: the one or more proposal transactions include a parameter based on the predictive metric determined by a provider; and the step of scoring the one or more proposal transactions based on the predictive metric includes scoring the proposal transactions based on the parameter.

Clause 6. The method of Clause 5, the method including: in the provider: determining the parameter based on the predictive metric and at least one of a static criterion, a dynamic criterion, or a parameter included in the client service request.

Clause 7. The method of Clause 1, wherein the step of scoring the one or more proposal transactions based on the predictive metric further comprises scoring the one or more proposal transactions based on at least one of a provider reputation value, a currency value, a load sharing metric, a fairness metric, or a provisioning metric.

Clause 8. A system for servicing a client service request, the system comprising: one or more processors; and one or more memory devices in communication with the one or more processors, the memory devices having computer-readable instructions stored thereupon that, when executed by the processors, cause the processors to perform a method for selecting a provider to service a client service request using a predictive metrics based consensus protocol the method comprising: receiving a client service request; forwarding the client service request to a set of service providers; receiving one or more proposed transactions from the set of service providers; scoring the proposal transactions based on at least one predictive metric; selecting a selected one of the proposal transactions based on the scoring; and writing the selected one of the proposal transactions to a service transaction blockchain.

Clause 9. The system of Clause 8, where the method includes: creating a candidate block having at least some of the one or more proposed transactions received from the set of service providers; sending the candidate block to one or more miners in a cluster; receiving other candidate blocks from at least some of the one or more miners in the cluster; and the step of scoring the proposal transactions based on at least one predictive metric comprises scoring the proposal transactions in the candidate blocks based on at least one predictive metric.

Clause 10. The system of Clause 9, wherein the at least one predictive metric comprises a macro predictive metric determined in one of the miners.

Clause 11. The system of Clause 9, where the method includes: determining a selected one of the miners that created the candidate block with the selected one of the proposal transactions; and the step of writing the selected one of the proposal transactions to a service transaction blockchain comprises writing the selected one of the proposal transactions to a service transaction blockchain by the selected one of the miners.

Clause 12. The system of Clause 8, where: the proposal transactions include at least one parameter based on at least one predictive metric determined in the providers; and the step of scoring the proposal transactions based on at least one predictive metric includes scoring the proposal transactions based on the at least one parameter included in the proposal transactions.

Clause 13. The system of Clause 12, the method including: in one or more providers: determining the at least one parameter included in the proposal transactions based on at least one predictive metric and at least one of a static criterion and a dynamic criterion.

Clause 14. The system of Clause 8, wherein the step of scoring the proposal transactions based on at least one predictive metric comprises scoring the proposal transactions based on at least one predictive metric and at least one of a provider reputation value, a currency value, a load sharing metric, a fairness metric, and a provisioning metric.

Clause 15. One or more computer storage media having computer executable instructions stored thereon which, when executed by one or more processors, cause the processors to execute a method for selecting a provider to service a client service request using a predictive metrics based consensus protocol, the method comprising: receiving a client service request; forwarding the client service request to a set of service providers; receiving one or more proposed transactions from the set of service providers; scoring the proposal transactions based on at least one predictive metric; selecting a selected one of the proposal transactions based on the scoring; and writing the selected one of the proposal transactions to a service transaction blockchain.

Clause 16. The computer readable media of Clause 15, where the method includes: creating a candidate block having at least some of the one or more proposed transactions received from the set of service providers; sending the candidate block to one or more miners in a cluster; receiving other candidate blocks from at least some of the one or more miners in the cluster; and the step of scoring the proposal transactions based on at least one predictive metric comprises scoring the proposal transactions in the candidate blocks based on at least one predictive metric.

Clause 17. The computer readable media of Clause 16, wherein: the step of scoring the proposal transactions based on at least one predictive metric comprises scoring the proposal transactions based on at least one of a predictive metric determined in the providers and a macro predictive metric determined in one of the miners and at least one of a provider reputation value, a currency value, a load sharing metric, a fairness metric, a provisioning metric, a static criterion and a dynamic criterion.

Clause 18. The computer readable media of Clause 16, where the method includes: determining a selected one of the miners that created the candidate block with the selected one of the proposal transactions; and the step of writing the selected one of the proposal transactions to a service transaction blockchain comprises writing the selected one of the proposal transactions to a service transaction blockchain by the selected one of the miners.

Clause 19. The computer readable media of Clause 15, where: the proposal transactions include at least one parameter based on at least one predictive metric determined in the providers; and the step of scoring the proposal transactions based on at least one predictive metric includes scoring the proposal transactions based on the at least one parameter included in the proposal transactions.

Clause 20. The computer readable media of Clause 19, the method including: in one or more providers: determining the at least one parameter included in the proposal transactions based on at least one predictive metric and at least one of a static criterion and a dynamic criterion.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approach involving PPoM. The specific examples of different aspects of PPOM described herein are illustrative and are not intended to limit the scope of the techniques shown.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method comprising:
   receiving, at a first miner from a plurality of miners, parameters of each proposal transaction from a plurality of proposal transactions for service providers to service a client service request, the parameters of at least one proposal transaction from the plurality of proposal transactions being received from a second miner in the plurality of miners;
   selecting, by the first miner using a selection algorithm, a first proposal transaction for a first service provider to service the client service request, the first miner selecting the first proposal transaction using the selection algorithm to analyze the plurality of proposal transactions based on the parameters of each proposal transaction, wherein each miner in the plurality of miners analyzes the plurality of proposal transactions using the selection algorithm; and
   responsive to selecting the first proposal transaction for the first service provider to service the client service request, appending, by the first miner, a block to a blockchain based on the first proposal transaction.

2. The computer-implemented method of claim 1, wherein the parameters of at least one other proposal transaction from the plurality of proposal transactions is received from a service provider.

3. The computer-implemented method of claim 1, wherein receiving the parameters of the at least one proposal transaction from the second miner comprises:
   receiving a candidate block generated by the second miner based on the at least one proposal transaction.

4. The computer-implemented method of claim 1, wherein the method further comprises:
   providing, from the first miner to at least one other miner, the parameters of the first proposal transaction.

5. The computer-implemented method of claim 4, wherein providing the parameters of the first proposal transaction comprises:
   creating a candidate block based on the first proposal transaction; and
   sending the candidate block from the first miner to the at least one other miner.

6. The computer-implemented method of claim 1, wherein selecting the first proposal transaction by the first miner using the selection algorithm comprises:
   determining a score for each proposal transaction from the plurality of proposal transactions based on the parameters of each proposal transaction; and
   selecting the first proposal transaction based on the scores.

7. The computer-implemented method of claim 6, wherein the parameters for each proposal transaction comprise one or more predictive metrics.

8. One or more computer storage media storing computer-useable instructions that, when used by a computing device, cause the computing device to perform operations, the operations comprising:
   receiving, at a first miner from a plurality of miners, parameters of each proposal transaction from a plurality of proposal transactions for service providers to service a client service request, the parameters of at least one proposal transaction from the plurality of proposal transactions being received from a second miner in the plurality of miners;
   selecting, by the first miner using a selection algorithm, a first proposal transaction for a first service provider to service the client service request, the first miner selecting the first proposal transaction using the selection algorithm to analyze the plurality of proposal transactions based on the parameters of each proposal transaction, wherein each miner in the plurality of miners analyzes the plurality of proposal transactions using the selection algorithm; and
   responsive to selecting the first proposal transaction for the first service provider to service the client service request, appending, by the first miner, a block to a blockchain based on the first proposal transaction.

9. The one or more computer storage media of claim 8, wherein the parameters of at least one other proposal transaction from the plurality of proposal transactions is received from a service provider.

10. The one or more computer storage media of claim 8, wherein receiving the parameters of the at least one proposal transaction from the second miner comprises:
   receiving a candidate block generated by the second miner based on the at least one proposal transaction.

11. The one or more computer storage media of claim 8, wherein the operations further comprise:
   providing, from the first miner to at least one other miner, the parameters of the first proposal transaction.

12. The one or more computer storage media of claim 11, wherein providing the parameters of the first proposal transaction comprises:
   creating a candidate block based on the first proposal transaction; and
   sending the candidate block from the first miner to the at least one other miner.

13. The one or more computer storage media of claim 8, wherein selecting the first proposal transaction by the first miner using the selection algorithm comprises:
   determining a score for each proposal transaction from the plurality of proposal transactions based on the parameters of each proposal transaction; and
   selecting the first proposal transaction based on the scores.

14. The one or more computer storage media of claim 13, wherein the parameters for each proposal transaction comprise one or more predictive metrics.

15. A computer system comprising:
   a processor; and
   a computer storage medium storing computer-useable instructions that, when used by the processor, causes the computer system to perform operations comprising:
      receiving, at a first miner from a plurality of miners, parameters of each proposal transaction from a plurality of proposal transactions for service providers to service a client service request, the parameters of at least one proposal transaction from the plurality of proposal transactions being received from a second miner in the plurality of miners;
      selecting, by the first miner using a selection algorithm, a first proposal transaction for a first service provider to service the client service request, the first miner selecting the first proposal transaction using the selection algorithm to analyze the plurality of proposal transactions based on the parameters of each proposal transaction, wherein each miner in the plurality of miners analyzes the plurality of proposal transactions using the selection algorithm; and
      responsive to selecting the first proposal transaction for the first service provider to service the client service request, appending, by the first miner, a block to a blockchain based on the first proposal transaction.

16. The computer system of claim 15, wherein the parameters of at least one other proposal transaction from the plurality of proposal transactions is received from a service provider.

17. The computer system of claim 15, wherein receiving the parameters of the at least one proposal transaction from the second miner comprises:
   receiving a candidate block generated by the second miner based on the at least one proposal transaction.

18. The computer system of claim 15, wherein the operations further comprise:
   providing, from the first miner to at least one other miner, the parameters of the first proposal transaction.

19. The computer system of claim 18, wherein providing the parameters of the first proposal transaction comprises:
   creating a candidate block based on the first proposal transaction; and
   sending the candidate block from the first miner to the at least one other miner.

20. The computer system of claim 15, wherein selecting the first proposal transaction by the first miner using the selection algorithm comprises:
   determining a score for each proposal transaction from the plurality of proposal transactions based on the parameters of each proposal transaction; and
   selecting the first proposal transaction based on the scores.

* * * * *